United States Patent
Wang et al.

(10) Patent No.: US 12,200,349 B2
(45) Date of Patent: Jan. 14, 2025

(54) VIDEO SHOOTING METHOD AND ELECTRONIC DEVICE

(71) Applicant: Honor Device Co., Ltd., Shenzhen (CN)

(72) Inventors: Long Wang, Shenzhen (CN); Jie Yi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/911,215

(22) PCT Filed: Jan. 26, 2022

(86) PCT No.: PCT/CN2022/074128
§ 371 (c)(1),
(2) Date: Dec. 8, 2022

(87) PCT Pub. No.: WO2022/252660
PCT Pub. Date: Dec. 8, 2022

(65) Prior Publication Data
US 2024/0129620 A1    Apr. 18, 2024

(30) Foreign Application Priority Data
May 31, 2021    (CN) .......................... 202110604950.5

(51) Int. Cl.
*H04N 23/63*    (2023.01)
*H04N 5/76*    (2006.01)
(Continued)

(52) U.S. Cl.
CPC ............. *H04N 23/632* (2023.01); *H04N 5/76* (2013.01); *H04N 23/633* (2023.01); *H04N 23/64* (2023.01); *H04N 23/667* (2023.01)

(58) Field of Classification Search
CPC .. H04N 23/632; H04N 23/667; H04N 23/633; H04N 23/64; H04N 5/76
See application file for complete search history.

(56) References Cited

U.S. PATENT DOCUMENTS

2007/0292123 A1* 12/2007 Ueda ...................... H04N 23/63
                                                                  396/374
2013/0083215 A1    4/2013 Wisniewski
(Continued)

FOREIGN PATENT DOCUMENTS

| CN | 108377334 A | 8/2018 |
|---|---|---|
| CN | 109495684 A | 3/2019 |

(Continued)

OTHER PUBLICATIONS

Anonymous "Multicam Recording Dual Camera" Feb. 22, 2021; Retrieved from the internet: https://apps.apple.com/gb/app/multicam-recording-dual-carmera/id1487644864, 8 pages.
(Continued)

*Primary Examiner* — Mishawn N. Hunter
(74) *Attorney, Agent, or Firm* — Conley Rose, P.C.

(57) ABSTRACT

A video shooting method and an electronic device to shoot a video in a dual-cam video recording scenario, thereby reducing difficulties in shooting videos. The electronic device displays a first screen. The electronic device displays a plurality of template options on the first screen in response to a first operation by a user on the first screen, each template option corresponds to an animation template for image processing. The electronic device displays a second screen in response to a second operation by the user on a first template option. In response to a third operation by the user on the second screen, the electronic device displays a third screen. In response to a fourth operation by a user on the third screen, recording of a video starts.

20 Claims, 28 Drawing Sheets

(51) Int. Cl.
  *H04N 23/60* (2023.01)
  *H04N 23/667* (2023.01)

(56) References Cited

U.S. PATENT DOCUMENTS

| | | | |
|---|---|---|---|
| 2013/0329100 A1 | | 12/2013 | Desai |
| 2018/0349008 A1* | | 12/2018 | Manzari ............. G06F 3/04883 |
| 2021/0344845 A1* | | 11/2021 | Li .......................... H04N 23/62 |
| 2022/0159183 A1 | | 5/2022 | Li et al. |

FOREIGN PATENT DOCUMENTS

| | | |
|---|---|---|
| CN | 110012352 A | 7/2019 |
| CN | 110072070 A | 7/2019 |
| CN | 110650304 A | 1/2020 |
| CN | 110865754 A | 3/2020 |
| CN | 112839190 A | 5/2021 |
| CN | 113727015 A | 11/2021 |

OTHER PUBLICATIONS

Stein, S., "iPhone 11's new multicam app lets you shoot video with two cameras at once" Jan. 28, 2020, Retrieved from the internet: https://www.cnet.com/tech/mobile/iphone-11s-new-multicam-app-lets-you-shoot-video-with-two-cameras-at-once/, 5 pages.

\* cited by examiner

```
┌─────────────────────────────────────────────────────────────┐
│ A mobile phone displays a screen a, where the screen a is a │
│ viewfinder screen displayed before the mobile phone starts   │──  S501
│ recording, and the screen a includes real-time images        │
│ collected by a camera a and a camera b in a plurality of     │
│ cameras                                                      │
└─────────────────────────────────────────────────────────────┘
                              │
                              ▼
┌─────────────────────────────────────────────────────────────┐
│ In response to an operation a on the screen a by a user, the │
│ mobile phone displays a plurality of template options on the │
│ screen a, where the operation a is used to trigger the       │── S502
│ mobile phone to shoot a micro-movie, and each template       │
│ option corresponds to an animation template; and the         │
│ animation template is used to process preview images         │
│ collected by at least two cameras in the plurality of        │
│ cameras and obtain a corresponding animation effect          │
└─────────────────────────────────────────────────────────────┘
                              │
                              ▼
┌─────────────────────────────────────────────────────────────┐
│ The mobile phone displays a screen b in response to an       │
│ operation b by the user on a template option c in the        │── S503
│ plurality of template options, where the operation b is used │
│ to trigger the mobile phone to play an animation effect; and │
│ the screen b is used to play an animation effect of an       │
│ animation template a corresponding to the template option c  │
└─────────────────────────────────────────────────────────────┘
                              │
                              ▼
┌─────────────────────────────────────────────────────────────┐
│ In response to an operation c by the user on the screen b,   │
│ the mobile phone uses the animation template a to process a  │── S504
│ real-time image a collected by a camera c and a real-time    │
│ image b collected by a camera d, so as to shoot a            │
│ micro-movie, where the camera c is one camera in the         │
│ plurality of cameras, and the camera d is one camera other   │
│ than the camera a in the plurality of cameras                │
└─────────────────────────────────────────────────────────────┘
```

FIG. 5

VIDEO SHOOTING METHOD AND ELECTRONIC DEVICE

CROSS-REFERENCE TO RELATED APPLICATIONS

This application is a U.S. National Stage of International Application No. PCT/CN2022/074128 filed on Jan. 26, 2022, which claims priority to Chinese Patent Application No. 202110604950.5, filed with the China National Intellectual Property Administration on May 31, 2021, both of which are incorporated herein by reference in its their entireties.

TECHNICAL FIELD

This application relates to the field of photographing technologies, and in particular, to a video shooting method and an electronic device.

BACKGROUND

At present, electronic devices such as mobile phones can provide not only a photographing function but also a video recording function. In the prior art, the video recording function is usually limited by the edge of an image frame, and a dynamic video can be recorded only by a user moving the electronic device. In practice, an ordinary user does not have a professional ability to frame and record a dynamic video by manipulating a mobile phone.

Therefore, a simple and convenient solution to dynamic video recording is urgently required to reduce difficulties in video shooting.

SUMMARY

This application provides a video shooting method and an electronic device, so as to shoot a micro-movie in a dual-cam video recording scenario, with no need to move an electronic device by a user to control framing, thereby reducing difficulties in shooting micro-movies in the dual-cam video recording scenario.

According to a first aspect, an embodiment of this application provides a video shooting method. The method is applied to an electronic device including a plurality of cameras. The electronic device displays a first screen, where the first screen is a viewfinder screen before the electronic device starts recording, and the first screen includes real-time images collected by two cameras in the plurality of cameras. The electronic device displays a plurality of template options on the first screen in response to a first operation by a user on the first screen, where the first operation is used to trigger the electronic device to shoot a micro-movie, each template option corresponds to an animation template for image processing, and the animation template is used for processing preview images collected by at least two cameras in the plurality of cameras to obtain a corresponding animation effect. The electronic device displays a second screen in response to a second operation by the user on a first template option in the plurality of template options, where the second screen is used to play an animation effect of a first animation template corresponding to the first template option. In response to a third operation by the user on the second screen, the electronic device processes, by using the first animation template, a first real-time image collected by a first camera and a second real-time image collected by a second camera, so as to shoot a micro-movie, where the first camera is one camera in the plurality of cameras, and the second camera is a camera other than the first camera in the plurality of cameras.

To sum up, according to the video shooting method in this embodiment of this application, in a dual-cam video recording scenario, animation processing on real-time images collected by two cameras can be performed based on the animation template selected by the user, to obtain a micro-movie with an animation effect. In this way, micro-movie recording in the dual-cam video recording scenario can be implemented, so as to record rich dual-cam video content. In addition, the user does not need to control complex operations such as framing, thereby reducing difficulties in recording micro-movies.

In a possible design manner of the first aspect, the processing, by using the first animation template, a real-time image collected by a first camera and a real-time image collected by a second camera includes: displaying, by the electronic device, a third screen, where the third screen is a viewfinder screen before the electronic device starts recording, so as to perform recording preparation on the third screen; the third screen includes a third real-time image collected by the first camera and a fourth real-time image collected by the second camera, the micro-movie recorded by using the first animation template includes a plurality of movie clips, the first animation template includes a plurality of animation sub-templates, and the plurality of movie clips are in one-to-one correspondence to the plurality of animation sub-templates; receiving, by the electronic device, a fourth operation by the user on the third screen, where the fourth operation is used to trigger the electronic device to record a first movie clip, the first movie clip is any one of the plurality of movie clips, and the first clip corresponds to a first animation sub-template; and displaying, by the electronic device, a fourth screen in response to the fourth operation; where the fourth screen is a viewfinder screen during video recording of the electronic device, the fourth screen includes a first preview image and a second preview image, the first preview image is obtained by the electronic device through animation processing on the first real-time image by using the first animation sub-template, and the second preview image is obtained by the electronic device through animation processing on the second real-time image by using the first animation sub-template.

That is, according to the method in this embodiment, recording preparation can be performed before recording, thereby improving micro-movie recording effects. The animation template includes a plurality of animation sub-templates for animation processing of a plurality of movie clips, so as to obtain micro-movies with richer animation effects through processing. In addition, during dual-cam video recording, the mobile phone can perform, according to the animation template, animation processing in real time on the real-time images collected by the two cameras, and display processed preview images on the recording viewfinder screen. This can reduce difficulties in recording videos with dynamic effects. An animation processing result can be presented to the user in real time, which helps preview a recording result in real time.

In another possible design manner of the first aspect, after the electronic device displays the fourth screen, the following step is further included: displaying, by the electronic device, the third screen in response to a first event, where the first event is an event that recording of the first movie clip has been completed.

That is, according to the method in this embodiment, after recording of each movie clip is completed, jumping to the third screen can be triggered again, so that recording preparation can be performed before recording of each movie clip. This further improves a micro-movie recording effect.

In another possible design manner of the first aspect, the third screen further includes a first window, and the first window is used to play an animation effect corresponding to the first animation sub-template.

That is, according to the method in this embodiment, an animation effect of a corresponding animation sub-template can be viewed at a recording preparation stage. In this way, framing can be adjusted more accurately based on the animation effect, thereby improving a recording effect.

In another possible design manner of the first aspect, each animation sub-template includes a first sub-template and a second sub-template, the first sub-template is used for animation processing on the first real-time image by the electronic device, and the second sub-template is used for animation processing on the second real-time image by the electronic device.

That is, according to the method in this embodiment, for different cameras, corresponding sub-templates can be used for processing. Therefore, different animation effects can be obtained through processing on the preview images collected by the two cameras at a same time point, thereby further improving a processing effect.

In another possible design manner of the first aspect, after the processing, by using the first animation template, a first real-time image collected by a first camera and a second real-time image collected by a second camera, the following step is further included: saving, by the electronic device, a first video file in response to a second event, where the second event is used to trigger the electronic device to save a processed video, the first video file includes a plurality of first video streams and a plurality of second video streams, the plurality of first video streams are in one-to-one correspondence to a plurality of movie clips, the plurality of second video streams are in one-to-one correspondence to a plurality of movie clips, each first video stream includes a plurality of frames of first preview images obtained by processing the corresponding movie clips, and each second video stream includes a plurality of frames of second preview images obtained by processing the corresponding movie clips.

That is, according to the method in this embodiment, a video file of the micro-movie can be generated after recording of the micro-movie is completed. In this way, the micro-movie recorded this time can be played later.

In another possible design manner of the first aspect, the third screen includes p first clip options, where p≥0, p is a natural number, and p is the number of clips in movie clips recorded completely; each first clip option corresponds to one movie clip recorded completely; and the third screen further includes a first control; and the following step is further included: receiving, by the electronic device, a select operation by the user on a second clip option, where the second clip option is one of the p first clip options, and the second clip option corresponds to a second movie clip; in response to the select operation by the user on the second clip option, playing, by the electronic device on the third screen, a plurality of processed frames of first preview images in the second movie clip and a plurality of processed frames of second preview images in the second movie clip; displaying, by the electronic device, first prompt information in the second screen in response to a tap operation by the user on the first control, where the first prompt information is used to prompt whether to reshoot the second movie clip; and displaying, by the electronic device, the fourth screen in response to a fifth operation by the user on the first prompt information, so as to reshoot the second movie clip.

That is, according to the method in this embodiment, a movie clip recorded completely can be re-recorded. This can ensure quality of each movie clip in the recorded micro-movie. Before re-recording, the user is prompted whether to record, thereby avoiding a misoperation by the user.

In another possible design manner of the first aspect, the third screen includes q third clip options, where q≥0, q is a natural number, and q is the number of clips in the movie clips not yet completely recorded; each third clip option corresponds to one movie clip not yet completely recorded; and the third screen further includes the first control, and before the receiving, by the electronic device, a fourth operation by the user on the third screen, the method further includes: selecting, by the electronic device, a fourth clip option in response to a third event, where the fourth clip option is one of the q third clip options, and the fourth clip option corresponds to the first movie clip; where the fourth operation is a tap operation performed by the user on the first control in a case that the fourth clip option is selected.

That is, according to the method in this embodiment, the movie clips to be recorded can be determined according to selection by the user, instead of being limited by a sequence of the movie clips. In this way, recording of the micro-movie can be more flexible.

In another possible design manner of the first aspect, after the displaying a fourth screen, the following step is further included; skipping, by the electronic device, responding to a sixth operation by the user on the fourth screen, where the sixth operation is used to trigger the electronic device to exchange a viewfinder frame of the first camera with a viewfinder frame of the second camera on the fourth screen; and the sixth operation includes a touch-and-hold operation or a drag operation.

That is, according to the method in this embodiment, inconsistency between an obtained preview and an animation effect of a corresponding animation sub-template resulting from exchange of viewfinder frames can be avoided during animation processing, thereby improving consistency between previews before and after.

In another possible design manner of the first aspect, different animation templates are applicable to different cameras, and the method further includes: starting, by the electronic device, the first camera and the second camera in response to the third operation by the user on the second screen, where the first camera and the second camera are cameras to which the first animation template is applicable.

That is, according to the method in this embodiment, a matching degree between a camera in use and a camera to which an animation template is applicable can be increased, thereby improving an animation processing effect.

In another possible design manner of the first aspect, the first screen includes a second control, the second control is used to trigger the electronic device to display a plurality of template options, and the first operation is a tap operation or a touch-and-hold operation on the second control.

That is, according to the method in this embodiment, the second control is provided in the before-recording viewfinder screen, facilitating triggering of micro-movie recording.

In another possible design manner of the first aspect, the first screen includes a third control; and the displaying, by the electronic device, a second screen in response to a second operation by the user on a first template option in the plurality of template options includes: selecting, by the electronic device, the first template option in response to a select operation by the user on the first template option in the plurality of template options; and in a case that the electronic device has selected the first template option, displaying, by the electronic device, the second screen in response to a tap operation by the user on the third control.

That is, in this embodiment, after the user selects a corresponding template option, playing of an animation template may be further triggered in response to a tap operation on the third control by the user. This ensures that an animation template required indeed by the user is played.

According to a second aspect, an embodiment of this application provides an electronic device, where the electronic device includes a plurality of cameras, a display, a memory, and one or more processors. The display and the memory are coupled to the processor. The memory is configured to store computer program codes, and the computer program codes include computer instructions. When the computer instruction is executed by the processor, the electronic device is enabled to perform the following steps: displaying, by the electronic device, a first screen, where the first screen is a viewfinder screen before the electronic device starts recording, and the first screen includes real-time images collected by two cameras in the plurality of cameras; displaying a plurality of template options on the first screen in response to a first operation by a user on the first screen, where the first operation is used to trigger micro-movie recording, each template option corresponds to an animation template for image processing, and the animation template is used for processing preview images collected by at least two cameras in the plurality of cameras to obtain a corresponding animation effect; displaying a second screen in response to a second operation by the user on a first template option in the plurality of template options, where the second screen is used to play an animation effect of a first animation template corresponding to the first template option; and in response to a third operation by the user on the second screen, processing, by using the first animation template, a first real-time image collected by a first camera and a second real-time image collected by a second camera, so as to shoot a micro-movie, where the first camera is one camera in the plurality of cameras, and the second camera is a camera other than the first camera in the plurality of cameras.

In a possible design manner of the second aspect, when the computer instruction is executed by the processor, the electronic device is enabled to further perform the following steps: displaying a third screen; displaying a third screen, where the third screen is a viewfinder screen before the electronic device starts recording, the third screen includes a third real-time image collected by the first camera and a fourth real-time image collected by the second camera, the micro-movie recorded by using the first animation template includes a plurality of movie clips, the first animation template includes a plurality of animation sub-templates, and the plurality of movie clips are in one-to-one correspondence to the plurality of animation sub-templates; receiving a fourth operation by the user on the third screen, where the fourth operation is used to trigger the electronic device to record a first movie clip, the first movie clip is any one of the plurality of movie clips, and the first clip corresponds to a first animation sub-template; and displaying a fourth screen in response to the fourth operation; where the fourth screen is a viewfinder screen during video recording of the electronic device, the fourth screen includes a first preview image and a second preview image, the first preview image is obtained by the electronic device through animation processing on the first real-time image by using the first animation sub-template, and the second preview image is obtained by the electronic device through animation processing on the second real-time image by using the first animation sub-template.

In another possible design manner of the second aspect, when the computer instruction is executed by the processor, the electronic device is enabled to further perform the following steps: displaying, by the electronic device, the third screen in response to a first event, where the first event is an event that recording of the first movie clip has been completed.

In another possible design manner of the second aspect, the third screen further includes a first window, and the first window is used to play an animation effect corresponding to the first animation sub-template.

In another possible design manner of the second aspect, each animation sub-template includes a first sub-template and a second sub-template, the first sub-template is used for animation processing on the first real-time image, and the second sub-template is used for animation processing on the second real-time image.

In another possible design manner of the second aspect, when the computer instruction is executed by the processor, the electronic device is enabled to further perform the following steps: saving a first video file in response to a second event, where the second event is used to trigger the electronic device to save a processed video, the first video file includes a plurality of first video streams and a plurality of second video streams, the plurality of first video streams are in one-to-one correspondence to a plurality of movie clips, the plurality of second video streams are in one-to-one correspondence to a plurality of movie clips, each first video stream includes a plurality of frames of first preview images obtained by processing the corresponding movie clips, and each second video stream includes a plurality of frames of second preview images obtained by processing the corresponding movie clips.

In another possible design manner of the second aspect, the third screen includes p first clip options, where p≥0, p is a natural number, and p is the number of clips in movie clips recorded completely; each first clip option corresponds to one movie clip recorded completely; and the third screen further includes a first control.

When the computer instruction is executed by the processor, the electronic device is enabled to further perform the following steps: receiving a select operation by the user on a second clip option, where the second clip option is one of the p first clip options, and the second clip option corresponds to a second movie clip; in response to the select operation by the user on the second clip option, playing, on the third screen, a plurality of processed frames of first preview images in the second movie clip and a plurality of processed frames of second preview images in the second movie clip; displaying first prompt information in the second screen in response to a tap operation by the user on the first control, where the first prompt information is used to prompt whether to reshoot the second movie clip; and displaying the fourth screen in response to a fifth operation by the user on the first prompt information, so as to reshoot the second movie clip.

In another possible design manner of the second aspect, the third screen includes q third clip options, where q≥0, q is a natural number, and q is the number of clips in the movie clips not yet completely recorded; each third clip option corresponds to one movie clip not yet completely recorded; and the third screen further includes the first control.

When the computer instruction is executed by the processor, the electronic device is enabled to further perform the following steps: selecting a fourth clip option in response to a third event, where the fourth clip option is one of the q third clip options, and the fourth clip option corresponds to the first movie clip; where the fourth operation is a tap operation performed by the user on the first control in a case that the fourth clip option is selected.

In another possible design manner of the second aspect, when the computer instruction is executed by the processor, the electronic device is enabled to further perform the following steps: skipping responding to a sixth operation by the user on the fourth screen, where the sixth operation is used to trigger the electronic device to exchange a viewfinder frame of the first camera with a viewfinder frame of the second camera on the fourth screen.

In another possible design manner of the second aspect, the sixth operation includes a touch-and-hold operation or a drag operation.

In another possible design manner of the second aspect, different animation templates are applicable to different cameras.

When the computer instruction is executed by the processor, the electronic device is enabled to further perform the following steps: starting the first camera and the second camera in response to the third operation by the user on the second screen, where the first camera and the second camera are cameras to which the first animation template is applicable.

In another possible design manner of the second aspect, the first screen includes a second control, the second control is used to trigger the electronic device to display a plurality of template options, and the first operation is a tap operation or a touch-and-hold operation on the second control.

In another possible design manner of the second aspect, the first screen includes a third control.

When the computer instruction is executed by the processor, the electronic device is enabled to further perform the following steps: selecting the first template option in response to a select operation by the user on the first template option in the plurality of template options; and in a case that the electronic device has selected the first template option, displaying the second screen in response to a tap operation by the user on the third control.

According to a third aspect, an embodiment of this application provides a chip system, where the chip system is applied to an electronic device including a plurality of cameras, a display, and a memory; the chip system includes one or more interface circuits and one or more processors; the interface circuit and the processor are interconnected through lines; the interface circuit is configured to receive a signal from the memory of the electronic device and send the signal to the processor, where the signal includes a computer instruction stored in the memory; and when the processor executes the computer instruction, the electronic device performs the method described in the first aspect and any one of the possible design manners.

According to a fourth aspect, this application provides a computer storage medium, where the computer storage medium includes a computer instruction, and when the computer instruction is run on an electronic device, the electronic device is enabled to perform the method described in the first aspect and any one of the possible design manners.

According to a fifth aspect, this application provides a computer program product, where when the computer program product is run on a computer, the computer is enabled to perform the method described in the first aspect and any one of the possible design manners.

It can be understood that for beneficial effects to be achieved by the electronic device according to the second aspect, the chip system according to the third aspect, the computer storage medium according to the fourth aspect, and the computer program product according to the fifth aspect, reference may be made to the beneficial effects in the first aspect and any one of the possible design manners, and details are not repeated herein.

BRIEF DESCRIPTION OF DRAWINGS

FIG. 5 is a flowchart of a video shooting method according to an embodiment of this application;

FIG. 14b-1 and FIG. 14b-2 are a flowchart of another video shooting method according to an embodiment of this application;

DETAILED DESCRIPTION OF EMBODIMENTS

The terms "first" and "second" described below are merely used for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application. "plurality" means at least two, unless otherwise specified.

The following further describes implementations of the embodiments of this application in detail with reference to the accompanying drawings. The video shooting method provided by the embodiments of this application can be applied to a dual-cam video recording scenario. Dual-cam video recording refers to a manner in which two cameras are turned on at a same time point for video recording. In the dual-cam video recording scenario, there are two images collected by two cameras on a viewfinder screen displayed by a mobile phone.

Figure 1A:
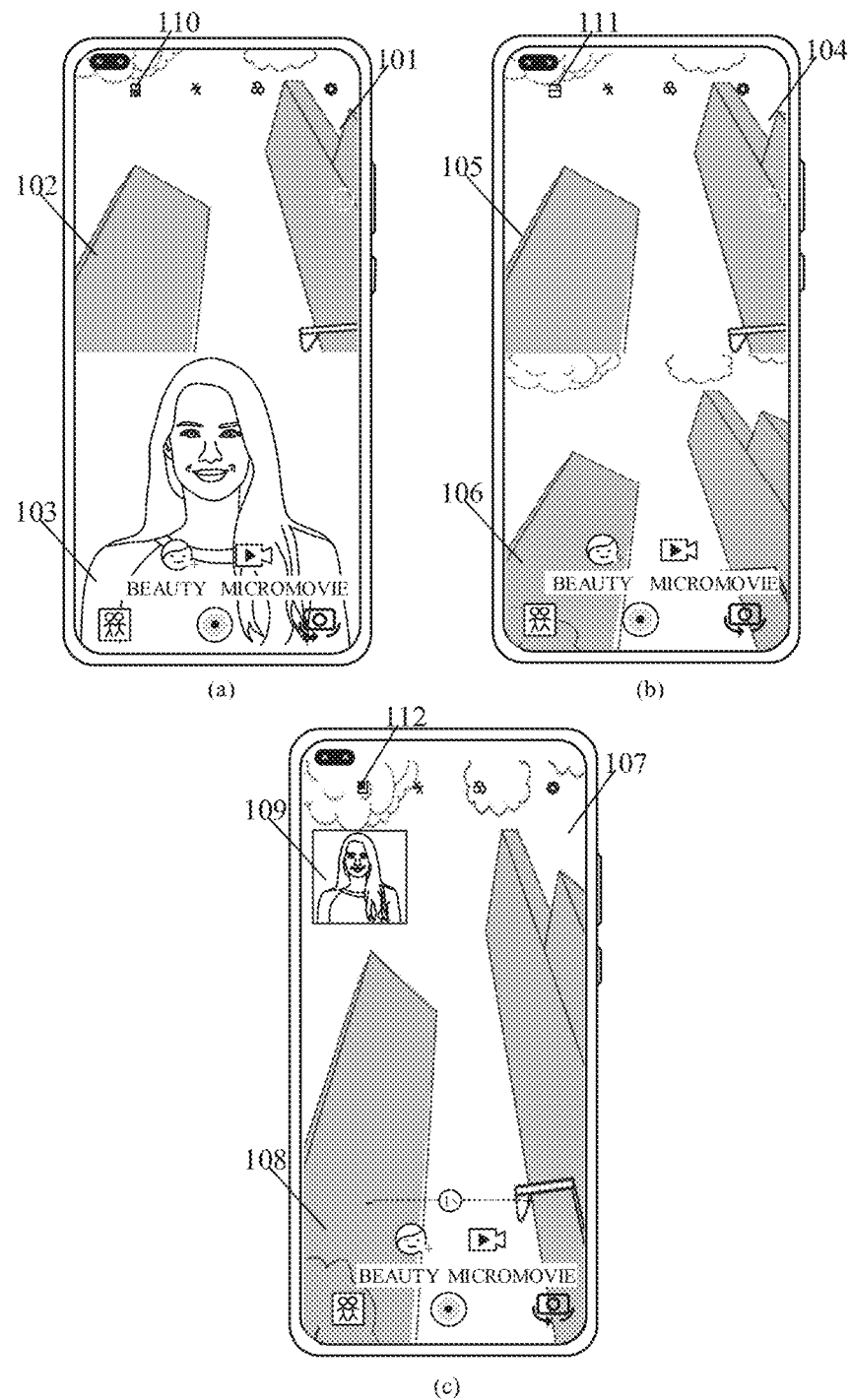
FIG. 1a is a schematic diagram of a dual-cam video recording screen in a portrait mode according to an embodiment of this application.
Figure 1B:
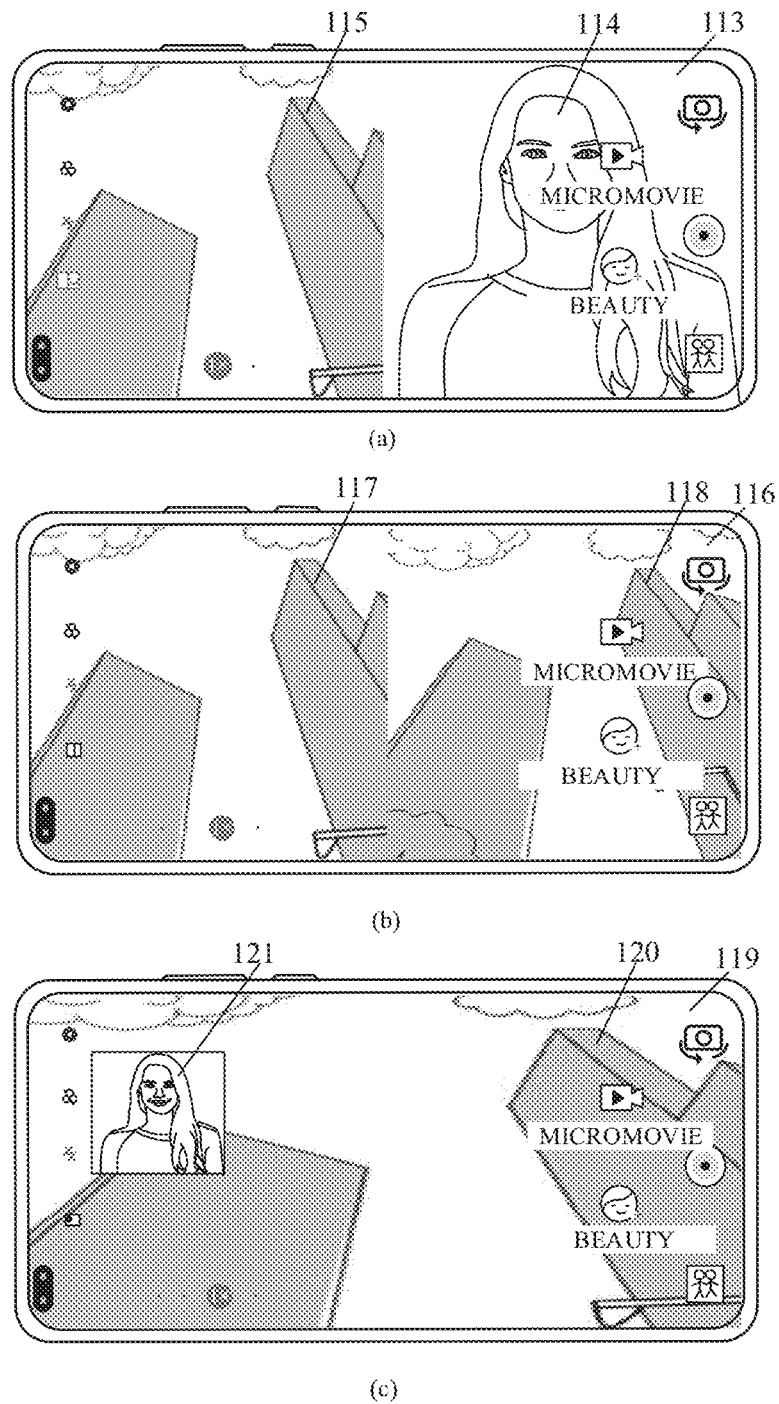
FIG. 1b is a schematic diagram of a dual-cam video recording screen in a portrait mode according to an embodiment of this application.

For ease of understanding of the embodiments of this application, the following uses the electronic device being a mobile phone as an example for description with reference to the dual-cam video recording scenario in FIG. 1a and FIG. 1b.

The mobile phone may display a viewfinder screen 101 shown in (a) of FIG. 1a, and the viewfinder screen 101 includes a real-time image 102 collected by a first camera (for example, a rear-facing main camera) and a real-time image 103 collected by a second camera (for example, a front-facing camera); or, the mobile phone may display a viewfinder screen 104 shown in (b) of FIG. 1a, and the viewfinder screen 104 includes a real-time image 105 collected by the first camera (for example, the rear-facing telephoto camera) and a real-time image 106 collected by the second camera (for example, the rear-facing wide-angle camera); or, the mobile phone may display a viewfinder screen 107 shown in (c) of FIG. 1a, and the viewfinder screen 107 includes a real-time image 108 collected by the first camera (for example, the rear-facing main camera) and a real-time image 109 collected by the second camera (for example, the front-facing camera).

The viewfinder screen 101 shown in (a) in FIG. 1a, the viewfinder screen 104 shown in (b) in FIG. 1a, and the viewfinder screen 107 shown in (c) in FIG. 1a are all viewfinder screens in a portrait mode.

In some embodiments, the mobile phone may also implement dual-cam video recording in a landscape mode. In this embodiment, the mobile phone may display a viewfinder screen 113 shown in (a) of FIG. 1b, and the viewfinder screen 113 includes a real-time image 114 collected by the first camera (for example, the rear-facing main camera) and a real-time image 115 collected by the second camera (for example, the front-facing camera); or, the mobile phone may display a viewfinder screen 116 shown in (b) of FIG. 1b, and the viewfinder screen 116 includes a real-time image 117 collected by the first camera (for example, the rear-facing telephoto camera) and a real-time image 118 collected by the second camera (for example, the rear-facing wide-angle camera); or, the mobile phone may display a viewfinder screen 119 shown in (c) of FIG. 1b, and the viewfinder screen 119 includes a real-time image 120 collected by the first camera (for example, the rear-facing main camera) and a real-time image 121 collected by the second camera (for example, the front-facing camera).

In the following embodiments, the solution of the embodiments of this application is mainly described in a portrait mode (as shown in FIG. 1a).

In the dual-cam video recording scenario, the viewfinder screen may further include a mode identifier, where the mode identifier is used to indicate a currently used preview camera (such as the front-facing camera and the rear-facing camera) and to indicate a display layout, of real-time images collected by the preview camera, on the viewfinder screen.

For example, it is assumed that a character image is a real-time image collected by the front-facing camera, and a building image is a real-time image collected by the rear-facing camera. The viewfinder screen 101 shown in (a) of FIG. 1a includes a mode identifier 110, and the mode identifier 110 is used to indicate that the currently used preview cameras are one rear-facing camera and one front-facing camera, and a real-time image collected by the rear-facing camera and a real-time image collected by the front-facing camera are displayed as a top-bottom layout on the viewfinder screen. The viewfinder screen 104 shown in (b) of FIG. 1a includes a mode identifier 111, and the mode identifier 111 is used to indicate that the currently used preview cameras are two rear-facing camera (such as a rear-facing telephoto camera and a rear-facing wide-angle camera), and real-time images collected by the two rear-facing cameras are displayed as a top-bottom layout on the viewfinder screen. The viewfinder screen 107 shown in (c) of FIG. 1a includes a mode identifier 112, and the mode identifier 112 is used to indicate that the currently used preview cameras are one rear-facing camera and one front-facing camera, and a real-time image collected by the rear-facing camera and a real-time image collected by the front-facing camera are displayed as a picture-in-picture layout on the viewfinder screen.

In addition, in the embodiments of this application, a specific manner of triggering dual-cam video recording is not limited. In some embodiments, a control a is provided on an additional function menu screen (also referred to as a "More" menu screen) of a camera application, where the control a is used to trigger the mobile phone to start the dual-cam video recording function. The mobile phone may receive a tap operation on the control a by the user. The mobile phone may display a screen a in response to the tap operation on the control a by the user. The screen a is a viewfinder screen displayed before dual-cam video recording starts.

Figure 2:
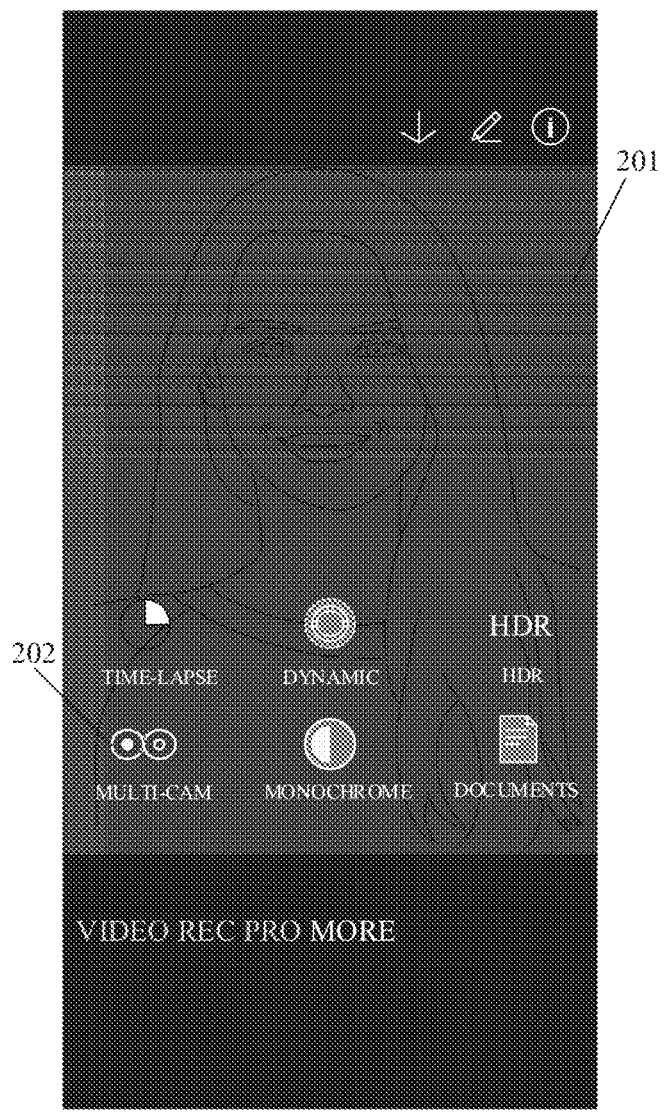
FIG. 2 is a schematic diagram of an entrance screen for dual-cam video recording according to an embodiment of this application.

For example, an additional function menu screen 201 shown in FIG. 2 includes a control a 202. The mobile phone may receive a tap operation on the control a 202 by the user. In response to a tap operation on the control a 202 by the user, the mobile phone may display the viewfinder screen 101 shown in (a) of FIG. 1a, where the viewfinder screen 101 is a viewfinder screen displayed before dual-cam video recording starts.

In some other embodiments, a control b is included in a viewfinder screen of ordinary video recording, and the control b is used to trigger the mobile phone to display a plurality of mode options. Each mode option corresponds to a display layout (such as a picture-in-picture layout). The mobile phone may receive a tap operation on the control b by the user. In response to a tap operation on the control b by the user, the mobile phone may display a mode selection window on the viewfinder screen of ordinary video recording. The mobile phone may receive a select operation by the user on a mode option a in the plurality of mode options. The mobile phone may display a screen a in response to the select operation (for example, a tap operation) on the mode option a by the user. The screen a is a viewfinder screen displayed before dual-cam video recording starts. In the viewfinder screen displayed before dual-cam video recording, the real-time image collected by the first camera and the real-time image collected by the second camera are displayed as a display layout a corresponding to the mode option a. That is, in this embodiment, dual-cam video recording is integrated into ordinary video recording, and ordinary video recording can be switched to dual-cam video recording.

Figure 3A:
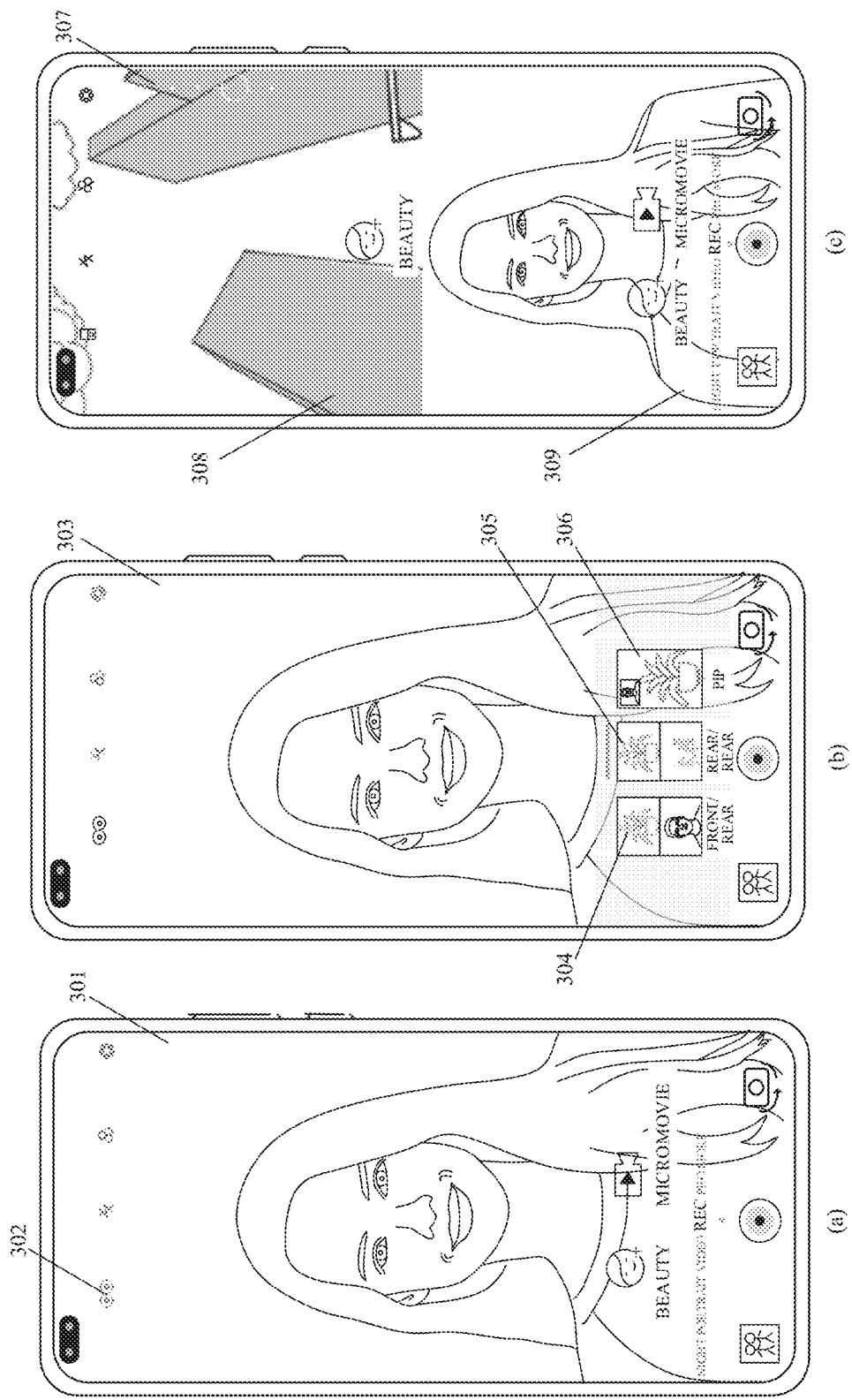
FIG. 3a is a schematic diagram of another entrance screen for dual-cam video recording according to an embodiment of this application.

For example, a viewfinder screen 301 for ordinary video recording shown in (a) of FIG. 3a includes a control b 302. The mobile phone may receive a tap operation on the control b 302 by the user. In response to a tap operation on the control b 302 by the user, the mobile phone may display the viewfinder screen 303 for ordinary video recording shown in (b) of FIG. 3a. The viewfinder screen 303 includes a plurality of mode options, namely a mode option 304, a mode option 305, and a mode option 306. The mode option 303 corresponds to a top-bottom display layout for the real-time image collected by the front-facing camera and the real-time image collected by the rear-facing camera; the mode option 304 corresponds to a top-bottom display layout for the real-time images collected by the two rear-facing cameras; and the mode option 305 corresponds to a picture-in-picture display layout for the real-time image collected by the front-facing camera and the real-time image collected by the rear-facing camera. The mobile phone may receive a tap operation on the mode option 304 by the user, that is, the mode option a is the mode option 304. In response to the tap operation on the mode option 304 by the user, the mobile phone may display a screen a 307 shown in (c) of FIG. 3a. In the screen a 307, a real-time image 308 collected by the rear-facing camera and a real-time image 309 collected by the front-facing camera are displayed as a top-bottom display layout.

In some other embodiments, a tab bar of the camera application includes a multi-cam recording tab (tab). Dual-cam video recording can be directly accessed by triggering the multi-cam recording tab. Specifically, the multi-cam recording tab is provided in the camera application, and the mobile phone may receive a trigger operation (for example, a tap operation or a touch-and-hold operation) on the multi-cam recording tab by the user. In response to the trigger operation on the multi-cam recording tab by the user, the mobile phone may display a screen a. The screen a is a viewfinder screen displayed before dual-cam video recording starts. In this way, dual-cam video recording can be triggered by using an independent tab in the camera application, to avoid functional compatibility problems with other tabs.

Figure 3B:
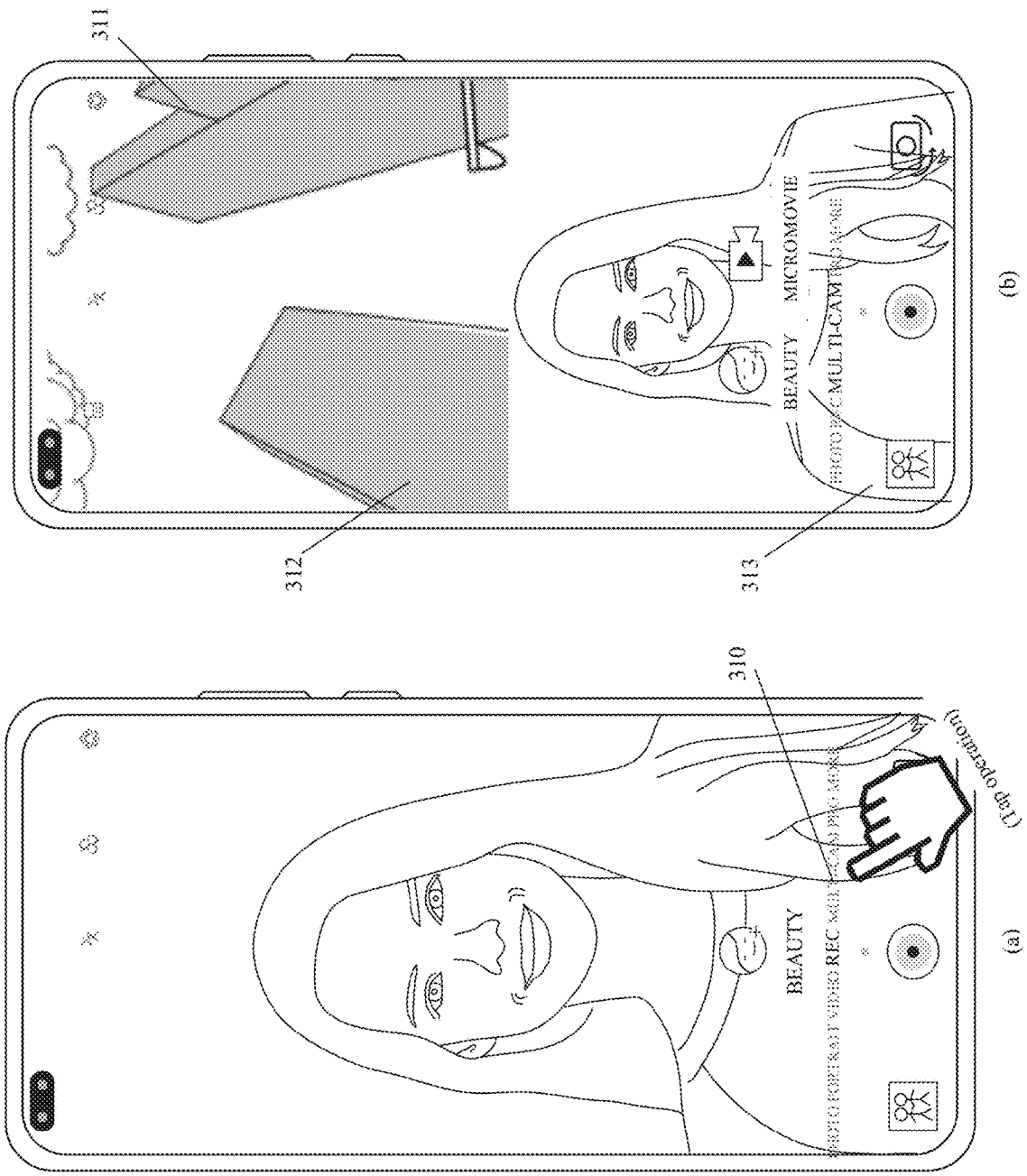
FIG. 3b is a schematic diagram of another entrance screen for dual-cam video recording according to an embodiment of this application.

The trigger operation on the multi-cam recording tab by the user being a tap operation is used as an example. The camera application provides a multi-cam recording tab 310 shown in (a) of FIG. 3b. The mobile phone may receive a tap operation on the multi-cam recording tab 310 by the user. In response to the tap operation on the multi-cam recording tab 310 by the user, the mobile phone may display a screen a 311 shown in (b) of FIG. 3b. In the screen a 311, a real-time image 312 collected by the rear-facing camera and a real-time image 313 collected by the front-facing camera are displayed as a top-bottom display layout. At that time, dual-cam video recording is accessed.

An embodiment of this application provides a video shooting method, and the method can be applied to an electronic device. The electronic device can provide a video recording function, specifically a dual-cam video recording function. During dual-cam video recording, the electronic device may perform, according to an animation template selected by the user, animation processing on images collected by two cameras, so as to record a micro-movie with animation effect.

To sum up, according to the video shooting method provided by this embodiment of this application, a micro-movie can be recorded without relying on complex operations such as moving control of the electronic device by the user, thereby reducing difficulties in recording dynamic videos.

For example, the electronic device in the embodiments of this application may be a device including the foregoing folding screen, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistants (personal digital assistant, PDA), or an augmented reality (augmented reality, AR)\virtual reality (virtual reality, VR) device. A specific form of the electronic device is not specially limited in the embodiments of this application.

Figure 4:
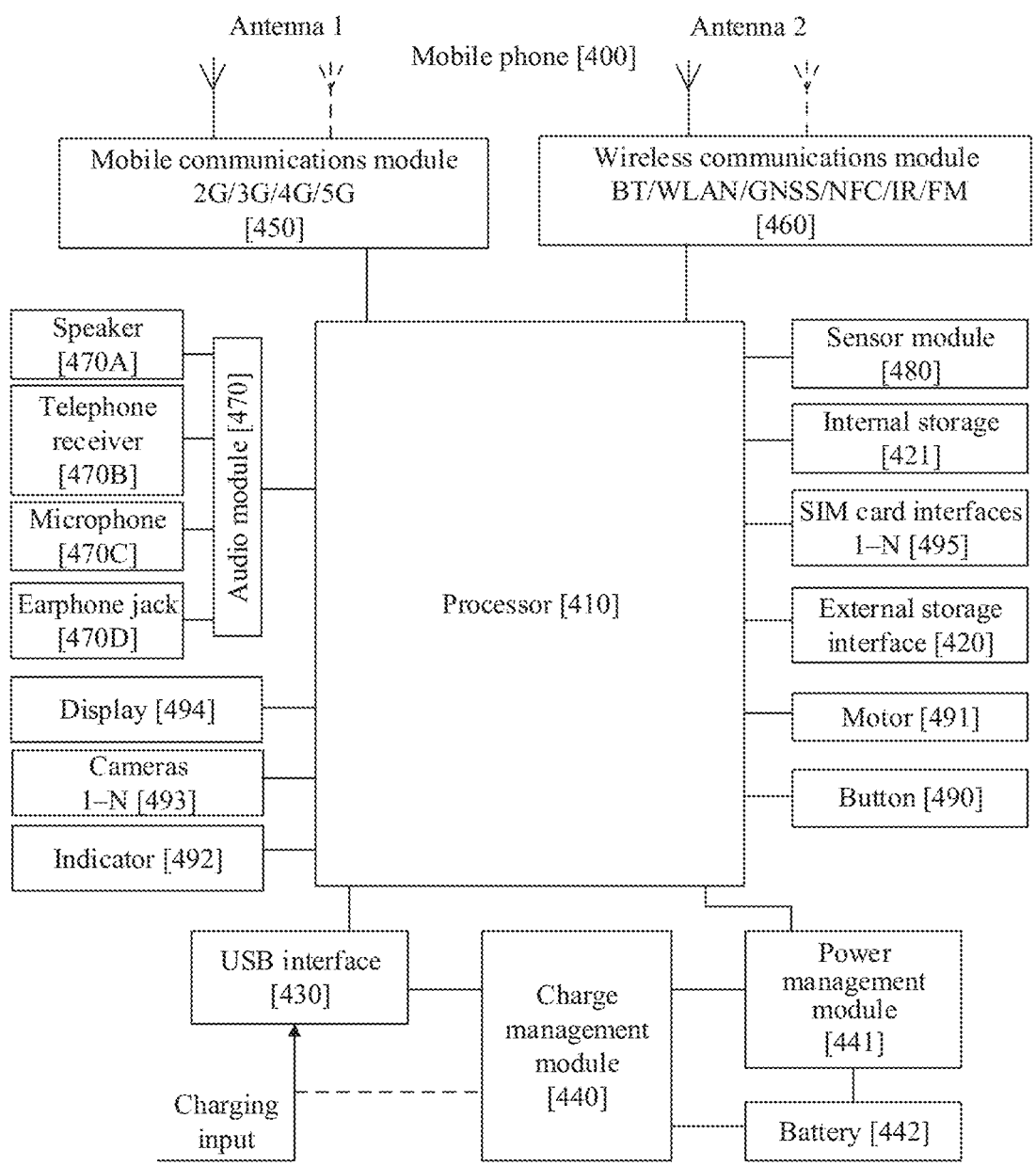
FIG. 4 is a schematic diagram of a hardware structure of a mobile phone according to an embodiment of this application.

The electronic device being a mobile phone is used as an example. Referring to FIG. 4, FIG. 4 is a schematic structural diagram of a mobile phone 400 according to an embodiment of this application. As shown in FIG. 4, the electronic device may include a processor 410, an external storage interface 420, an internal storage 421, a universal serial bus (universal serial bus, USB) interface 430, a charge management module 440, a power management module 441, a battery 442, an antenna 1, an antenna 2, a mobile communications module 450, a wireless communications module 460, an audio module 470, a speaker 470A, a telephone receiver 470B, a microphone 470C, an earphone jack 470D, a sensor module 480, a button 490, a motor 491, an indicator 492, a camera 493, a display 494, a subscriber identification module (subscriber identification module, SIM) card interface 495, and the like. It can be understood that the structure illustrated in this embodiment does not constitute any specific limitation on the electronic device. In some other embodiments, the electronic device may include more or fewer components than those shown in the figure, or combine some components, or split some components, or have different component arrangements. The components shown in the figure may be implemented in hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components or integrated in one or more processors.

A controller may be a nerve center and command center of the electronic device. The controller may generate an operation control signal according to an instruction operation code and a timing signal, to complete control of instruction fetching and execution.

A memory may be further provided in the processor 410 for storing instructions and data. In some embodiments, the memory in the processor 410 is a cache. The cache may store instructions or data recently used or repeatedly used by the processor 410. If the processor 410 needs to use the instruction or data again, the processor 410 can directly invoke the instruction or data from the cache. This avoids repeated access and reduces a waiting time of the processor 410, thereby improving efficiency of a system.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that an interface connection relationship between the modules shown in this embodiment is merely an example for description, and does not constitute any limitation on the structure of the electronic device. In some other embodiments, the electronic device may alternatively use an interface connection manner different from those in the foregoing embodiment or a combination of a plurality of interface connection manners.

The charge management module 440 is configured to receive a charging input from a charger. The charger may be a wireless charger, or may be a wired charger. The power management module 441 is configured to connect to the battery 442, the charge management module 440, and the processor 410. The power management module 441 receives an input from the battery 442 and/or the charge management module 440, and supplies power to the processor 410, the internal storage 421, the external storage, the display 494, the camera 493, the wireless communications module 460, and the like.

A wireless communication function of the electronic device may be implemented by using the antenna 1, the antenna 2, the mobile communications module 450, the wireless communications module 460, the modem processor, the baseband processor, and the like.

The mobile communications module 450 may provide wireless communication solutions for use on the electronic device, including 2G, 3G, 4G, 5G, and the like. The mobile communications module 450 may include at least one filter, a switch, a power amplifier, a low noise amplifier (low noise amplifier, LNA), and the like.

The wireless communications module 460 may provide wireless communication solutions for the electronic device, including wireless local area network (wireless local area networks, WLAN) (for example, wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), infrared (infrared, IR) technology, and the like.

In some embodiments, the wireless communications module 36) may include an NFC chip, and the NFC chip may include an NFC controller (NFC controller, NFCC). The NFC chip can perform processing such as amplification, analog-to-digital conversion, digital-to-analog conversion, and storage on signals. The NFCC is responsible for physical transmission of data through the antenna. The NFCC may be included in the NFC chip of the electronic device. The device host (device host, DH) is responsible for managing the NFCC, such as initialization, configuration, and power management. The DH may be included in the main chip of the electronic device, or may be integrated with the processor of the electronic device.

In some embodiments, in the electronic device, the antenna 1 is coupled to the mobile communications module 450, and the antenna 2 is coupled to the wireless communications module 460, so that the electronic device can communicate with a network and other devices by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like.

The electronic device implements a display function by using the GPU, the display 494, the application processor, and the like. The GPU is an image processing microprocessor and connects to the display 494 and the application processor. The GPU is configured to perform mathematical and geometric computation for graphics rendering. The processor 410 may include one or more GPUs, which execute program instructions to generate or change display information.

The display 494 is configured to display images, videos, and the like. The display 494 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), and the like.

The electronic device may implement a photographing function by using the ISP, the camera 493, the video codec, the GPU, the display 494, the application processor, and the like. The ISP is configured to process data fed back by the camera 493. For example, during photographing, a shutter is opened, light is transferred to a photosensitive element of the camera through a lens, an optical signal is converted to an electrical signal, and the photosensitive element of the camera transfers the electrical signal to the ISP for processing, so that the electrical signal is converted to an image visible to a naked eye. The ISP may further perform algorithm optimization on an image noise, luminance, and complexion. The ISP may further optimize parameters such as an exposure and a color temperature of a shooting scenario. In some embodiments, the ISP may be disposed in the camera 493.

The camera 493 is configured to capture a static image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal to an electrical signal, and then transfers the electrical signal to the ISP, to convert the electrical signal to a digital image signal. The ISP outputs the digital image signals to the DSP for processing. The DSP converts the digital image signal to an image signal in a standard format such as RGB or YUV. In some embodiments, the electronic device may include one or N cameras 493, where N is a positive integer greater than 1.

The external storage interface 420 may be configured to connect an external memory card, for example, a micro SD card, to extend a storage capacity of the electronic device. The external memory card communicates with the processor 410 by using the external storage interface 420, to implement a data storage function. For example, files such as music and videos are stored in the external memory card.

The internal storage 421 may be configured to store computer executable program code, where the executable program code includes instructions. The processor 410 executes various functional applications of the electronic device and data processing by executing the instructions stored in the internal storage 421. For example, in response to an operation of expanding the display 494 by the user, the processor 410 may display different content on the display 484 by executing the instructions stored in internal storage 421. The internal storage 421 may include a program storage area and a data storage area. The program storage area may store an operating system, an application program required by at least one function (for example, a sound play function or an image play function), and the like. The data storage area may store data (for example, audio data or a phone book) and the like that are created during use of the electronic device. In addition, the internal storage 421 may include a high-speed random access memory, and may further include a nonvolatile memory, for example, at least one magnetic disk storage device, flash memory device, or universal flash storage (universal flash storage, UFS).

The electronic device may implement an audio function, for example, music playing or recording, by using the audio module 470, the loudspeaker 470A, the telephone receiver 470B, the microphone 470C, the earphone jack 470D, the application processor, and the like.

The button 490 includes a power key, a volume key, and the like. The button 490 may be a mechanical key, or may be a touch button. The electronic device may receive a button input and generate a button signal input related to user settings and function control of the electronic device. The motor 491 may generate vibrating alerts. The motor 491 may be used to vibrate to provide alerts for incoming calls, or may be used to vibrate to provide touch feedback. The indicator 492 may be an indicator light, and may be used to indicate a charging status and power change, or may be used to indicate messages, missed calls, notifications, and the like. The SIM card interface 495 is configured to connect a SIM card. The SIM card may be inserted into the SIM card interface 495 or removed from the SIM card interface 495 to implement contact with or separation from the electronic device. The electronic device may support one or N SIM card interfaces, where N is a positive integer greater than 1.

The method in the following embodiments can be all implemented in the mobile phone 400 having the foregoing hardware structure, and the method in the embodiments of this application is mainly described with reference to a dual-cam video recording scenario in a portrait mode.

An embodiment of this application provides a video shooting method, and the method can be applied to a mobile phone. The mobile phone includes at least a plurality of cameras, and the mobile phone may provide a dual-cam video recording function. As shown in FIG. 5, the method includes S501 to S504.

S501: The mobile phone displays a screen a, where the screen a is a viewfinder screen displayed before the mobile phone starts recording, and the screen a includes real-time images collected by a camera a and a camera b in the plurality of cameras.

The screen a may also be referred to as a first screen, which is the same hereinafter. The camera a and camera b are two cameras in the plurality of cameras.

Based on the foregoing description, in response to a tap operation on a control a by a user, the mobile phone may display the screen a; or the mobile phone may display the screen a in response to a select operation by the user on the mode option a in the plurality of mode options; or the mobile phone may display the screen a in response to a tap operation on a control b by the user. In addition, the screen a includes real-time images collected by two cameras. For example, the screen a 307 shown in (c) of FIG. 3a includes a real-time image 308 collected by the camera a (for example, a rear-facing main camera) and a real-time image 309 collected by the camera b (for example, a front-facing camera).

S502: In response to an operation a on the screen a by the user, the mobile phone displays a plurality of template options on the screen a, where the operation a is used to trigger the mobile phone to shoot a micro-movie, and each template option corresponds to an animation template; and the animation template is used to process preview images collected by at least two cameras in the plurality of cameras and obtain a corresponding animation effect.

The operation a may also be referred to as a first operation, which is the same hereinafter.

Before S502, the mobile phone may receive the operation a on the screen a by the user. The operation a may be a preset gesture a (for example, a slide gesture or a touch-and-hold gesture) performed by the user on the screen a; or the screen a includes a control c, and the control c is used to trigger the mobile phone to display a plurality of template options. The operation a is a trigger operation (for example, a tap operation or a touch-and-hold operation) on a control c by the user. The control c may also be referred to as a second control.

Figure 6:
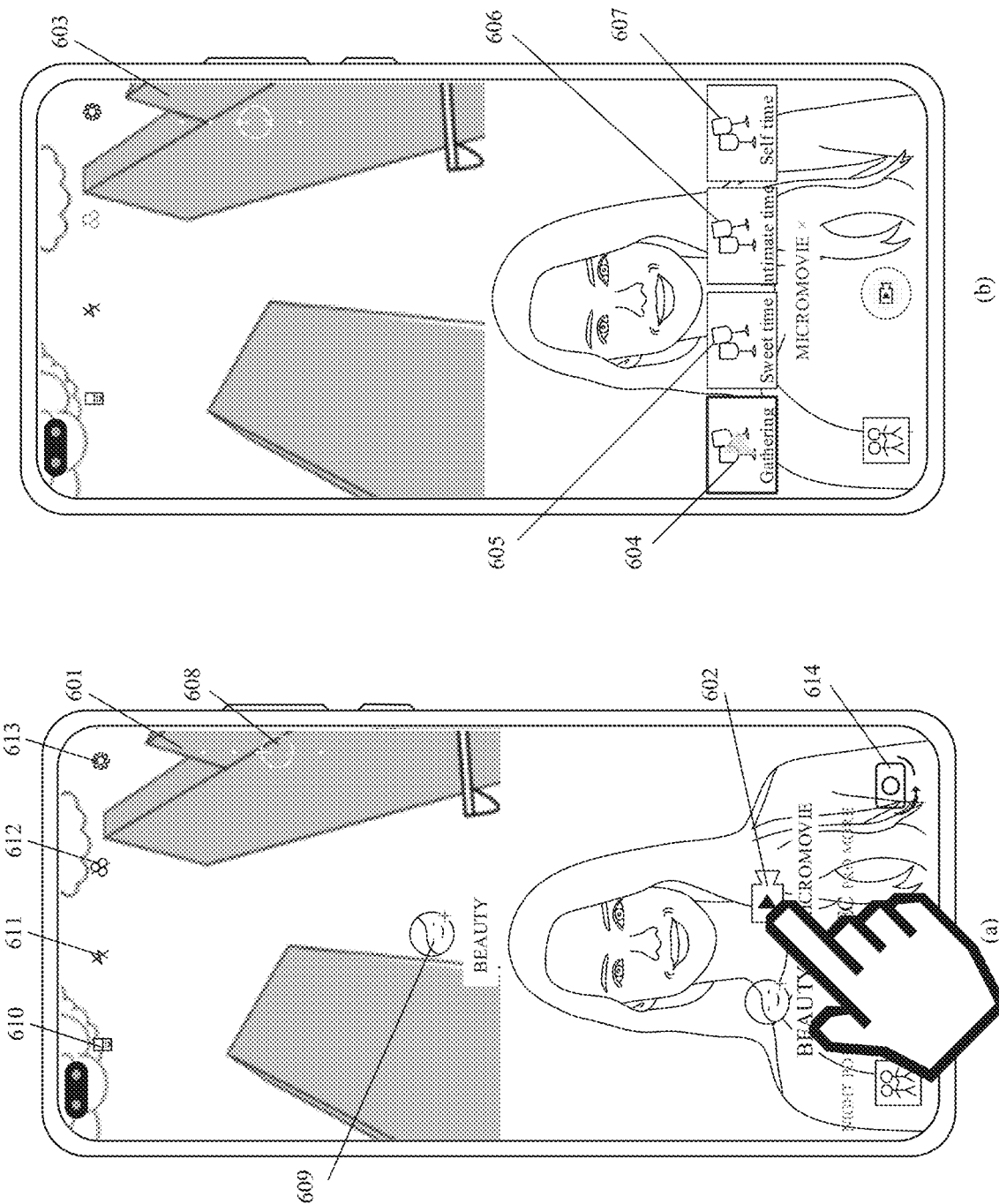
FIG. 6 is a schematic diagram of a video recording screen of a mobile phone according to an embodiment of this application.

The operation a being a tap operation on the control c by the user is used as an example, and a screen a 601 shown in (a) of FIG. 6 includes a control c 602. The mobile phone may receive a tap operation on the control c 602 by the user. It should be noted that the shape and position of the control c 602 shown in (a) of FIG. 6 are only an example, and are not limited thereto in actual implementation. For example, the control c may alternatively be displayed at a position on a right edge or a left edge of the screen a. For another example, the control c may alternatively be a circle or other shapes.

The animation template is a template for simulating dynamic effects of videos shot by the camera in various motion states. The motion states include pushing, pulling, panning, moving, tracking, swinging, and/or other states. Each animation template includes at least a dynamic effect in one motion state. For ease of understanding of the animation template, the following describes shooting effects of the camera in the motion state of pushing, pulling, panning, moving, tracking, or swinging.

1. Pushing: Pushing refers to a shooting method that makes the picture transition continuously from a large range of scene. Pushing in a shot is separating a subject from the environment, and also reminding a viewer to pay special attention to the subject or a specific detail of the subject.

2. Pulling: Opposite to pushing, pulling is showing a to-be-shot subject in the picture from near to far and from part to whole, so that the subject or details of the subject gradually become smaller. Pulling out a shot emphasizes a relationship between the subject and the environment.

3. Panning: Panning is keeping the camera unmoved in a position, only with an angle changed, and may be side-to-side or up-down panning, or may be tilting or rotation. The purpose is to show parts of a to-be-shot subject one by one, or to display the scale, or to show the environment. Most common panning is left-and-right panning, which is often used in TV shows.

4. Moving: Moving is an abbreviation of "movement", which means that the camera moves horizontally in all directions while shooting. Shooting while moving has relatively high requirements, and requires special equipment during actual shooting. Shooting while moving can produce a visual effect of patrolling or showing. If a subject is in a moving state, a visual effect of following the subject can be produced on the screen through shooting while moving.

5. Tracking: Tracking means a following shot, that is, the camera always follows a to-be-shot subject, so that the moving subject is always in the picture. Its role is to better represent a moving object.

6. Whip panning: Whip panning is actually one type of panning. The specific operation is that when a previous picture ends, the camera suddenly turns to another direction. In the panning process, the picture becomes very blurry, and a new picture appears only when the lens stays still. Its function is to express drastic changes in things, time and space, causing psychological urgency of people.

In S502, the operation a being a tap operation on the control c is used as an example, and in response to the tap operation on the control c 602 in the screen a 601 shown in (a) of FIG. 6, the mobile phone may display a screen a 603 shown in (b) of FIG. 6. The screen a 603 includes four template options, namely, a template option 604, a template option 605, a template option 606, and a template option 607. The template option 604 corresponds to an animation template of "Gathering", the template option 605 corresponds to an animation template of "Sweet time", the template option 606 corresponds to an animation template of "Intimate time", and the template option 606 corresponds to an animation template of "Self time".

It should be noted that the quantity, position, and shape of the template options shown in (b) of FIG. 6 are only an example, and are not limited thereto in actual implementation. For example, a plurality of template options may alternatively be displayed in the middle of the screen a. For another example, the plurality of template options can alternatively be arranged vertically. For another example, each template option has a different option cover.

In some embodiments, the plurality of template options include a plurality of template options a and a plurality of template options b, where each template option a corresponds to an animation template for image processing in single-cam video recording, and each template option b corresponds to an animation template for image processing in dual-cam video recording. It should be noted that, after the dual-cam video recording screen is accessed in a manner shown in (a) of FIG. 3b and (b) of FIG. 3b, the plurality of template options displayed usually include an animation template for dual-cam recording.

Figure 7:
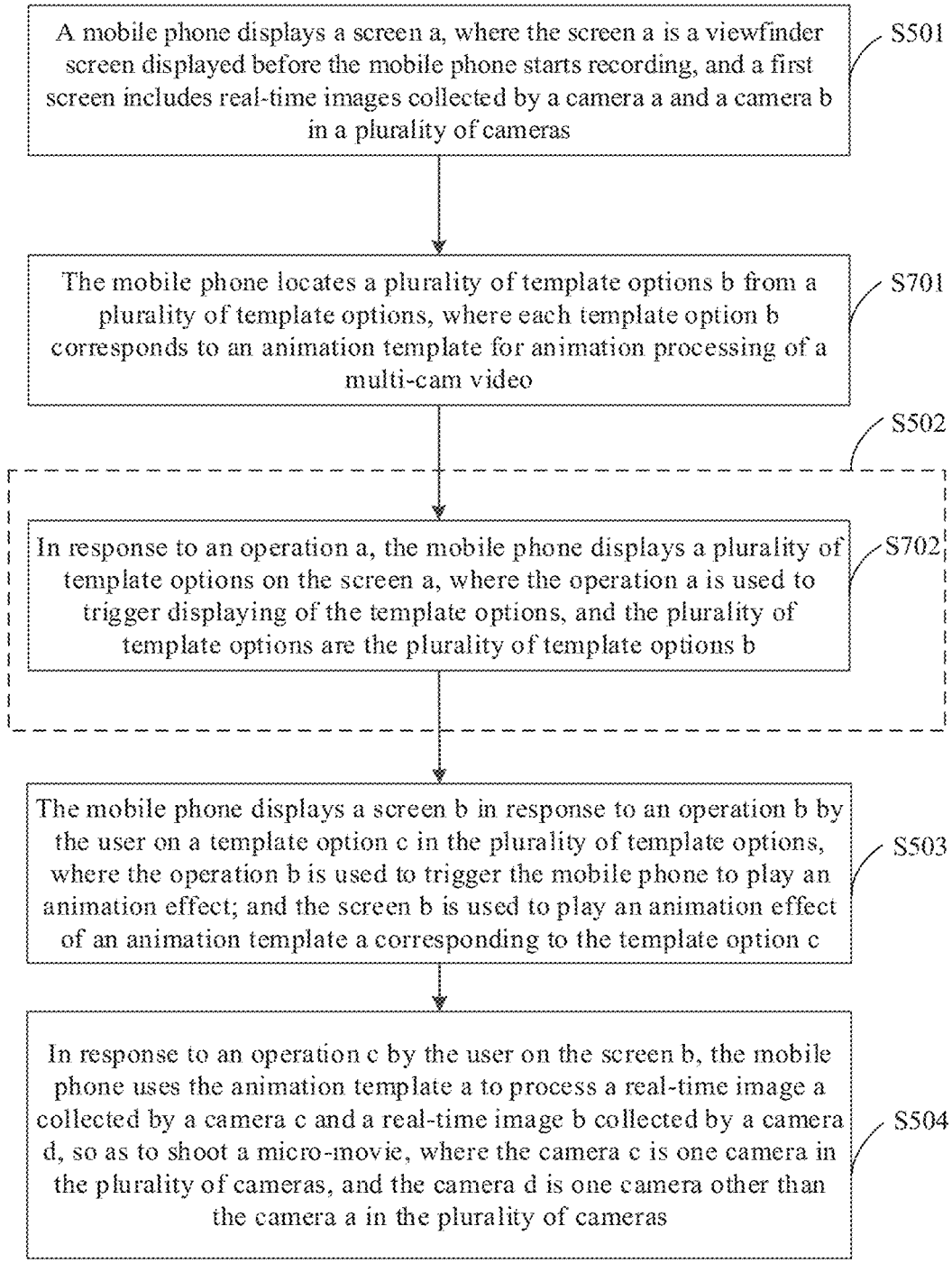
FIG. 7 is a flowchart of another video shooting method according to an embodiment of this application.

In this embodiment, in order to facilitate selection of an animation template matching the dual-cam video recording scenario by the user, as shown in FIG. 7, the method further includes S701.

S701. The mobile phone determines the plurality of template options b from the plurality of template options, where each template option b corresponds to an animation template for animation processing of a multi-cam video.

The mobile phone may determine the plurality of template options b based on scenario attributes of the template options. The scenario attribute is used to indicate a scenario to which the template option is applied. The applicable scenario includes a single-cam video recording scenario or a dual-cam video recording scenario. Specifically, if a scenario attribute of a template option is a first attribute, the template option is determined as the template option a. Specifically, if a scenario attribute of a template option is a second attribute, the template option is determined as the template option b. For example, if the scenario attribute of the template option is 1, the template option is determined as the template option b, that is: the second attribute is 1.

S502 further includes S702:

S702. In response to an operation a, the mobile phone displays a plurality of template options on the screen a, where the operation a is used to trigger displaying of the template options, and the plurality of template options are the plurality of template options b.

Specifically, starting from the first template option b, a plurality of template options b are displayed successively.

For example, the four template options included in the screen a 603 shown in (b) of FIG. 6 are all template options b applicable to the dual-cam video recording scenario. In addition, the template option 604 is the first template option b that is determined, the template option 605 is the second template option b that is determined, the template option 606 is the third template option b that is determined, and the template option 607 is the fourth template option b that is determined.

In this embodiment, for the dual-cam video recording scenario, the template option b is displayed for the user to select. In this way, the displayed template option may be adapted to the scenario, so as to quickly select a matching template option.

In some other embodiments, for ease of distinguishing scenarios (for example, a single-cam recording scenario or a dual-cam video recording scenario) to which the template options are applicable, when the mobile phone displays a plurality of template options, scenario identifiers are displayed at preset positions of the template options. The scenario identifier is used to indicate a scenario to which the template option is applied.

In some other embodiments, in response to the operation a, the mobile phone displays a plurality of template options on the screen a. At the same time, a plurality of function icons and controls on the screen a are hidden to simplify elements on the screen and facilitate selection of template options. For example, compared with the screen a 601 shown in (a) in FIG. 6, on the screen a 603 shown in (b) in FIG. 6, a zoom adjustment control 608, a beauty control 609, a mode identifier 610, a flash icon 611, a filter icon 612, a setting icon 613, and a lens switching control 614 are hidden.

S503: The mobile phone displays a screen b in response to an operation b by the user on a template option c in the plurality of template options, where the operation b is used to trigger the mobile phone to play an animation effect; and the screen b is used to play an animation effect of an animation template a corresponding to the template option c.

The template option c may also be referred to as a first template option, the operation b may also be referred to as a second operation, the screen b may also be referred to as a second screen, and the animation template a may also be referred to as a first animation template.

Before S503, the mobile phone may receive the operation b on the screen a by the user.

Figure 8:
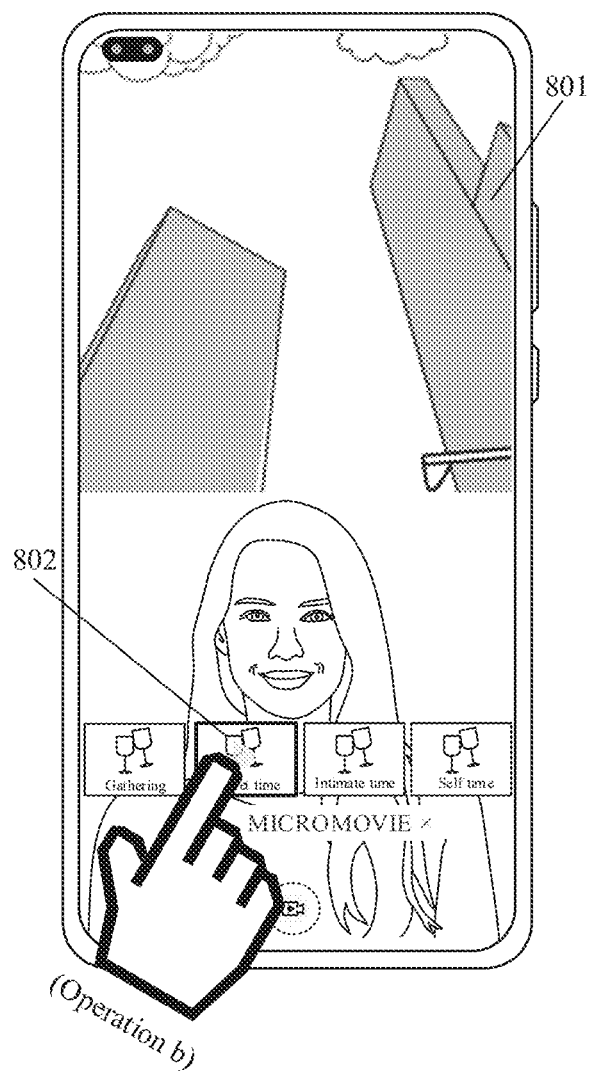
FIG. 8 is a schematic diagram of another video recording screen of a mobile phone according to an embodiment of this application.

In some embodiments, the operation b may be a select operation (for example, a tap operation or a touch-and-hold operation) on the template option c by the user. The operation b being a tap operation on the template option c is used as an example. The mobile phone may receive a tap operation by the user on a template option c 802 in a screen a 801 shown in FIG. 8.

In some other embodiments, a select operation by the user on the template option c can merely trigger the mobile phone to select the animation template a. Then, the mobile phone may display a screen b in response to a preset operation a by the user on the screen a. For example, the preset operation a may be a preset gesture b (for example, a sliding gesture) on the screen a; or the preset operation a is a touch-and-hold operation on a region with no control or icon displayed in the screen a; or the screen a includes a control d, the control d is used to trigger the mobile phone to play an animation effect, and the preset operation a is a trigger operation (such as a tap operation or a touch-and-hold operation) by the user on the control d. The control d may also be referred to as a third control.

Figure 9:
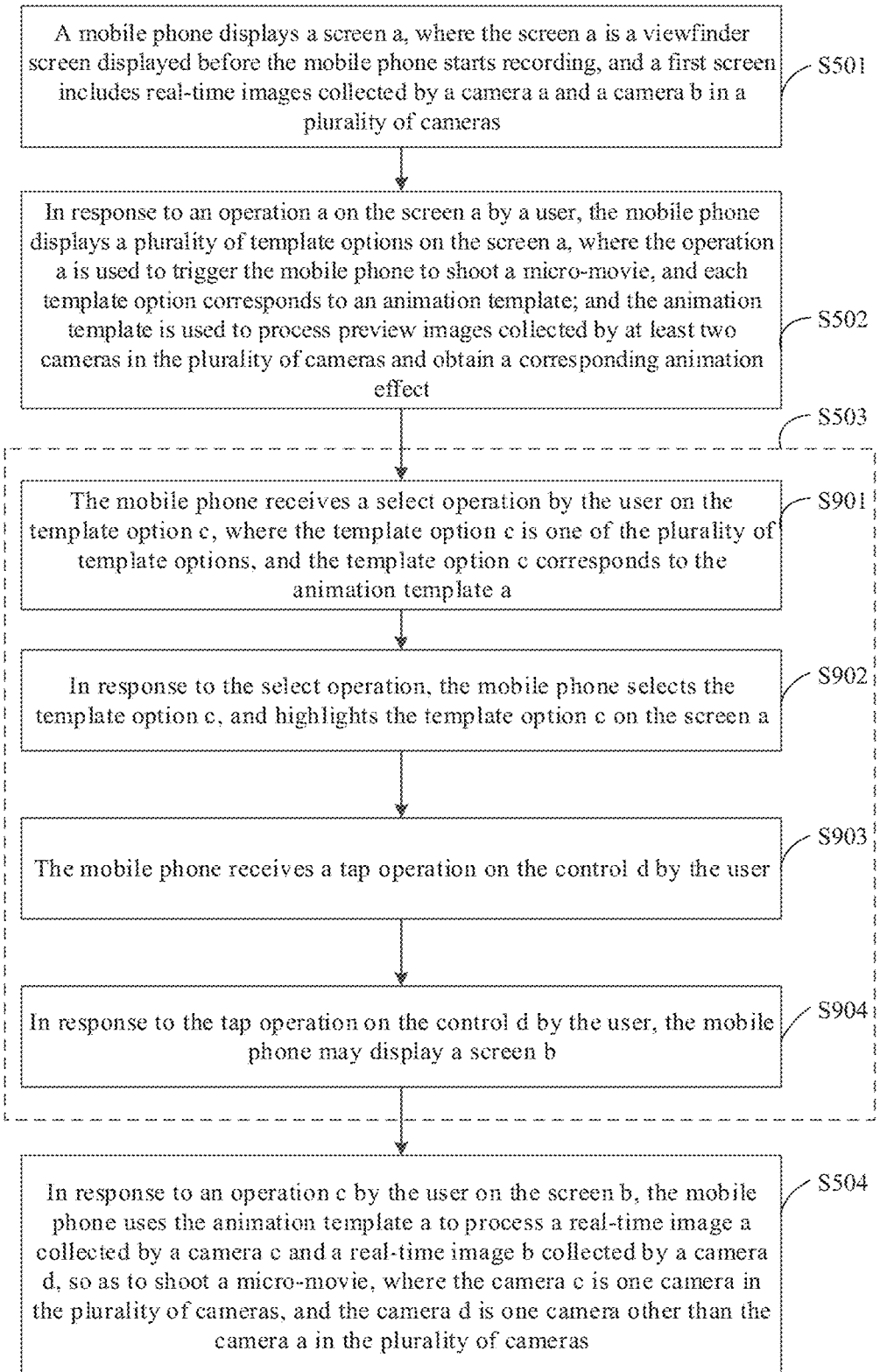
FIG. 9 is a flowchart of another video shooting method according to an embodiment of this application.

The operation b including a select operation by the user on the template option c and a tap operation on the control d is used as an example. As shown in FIG. 9, S503 includes S901 to S904:

S901: The mobile phone receives a select operation by the user on the template option c, where the template option c is one of the plurality of template options, and the template option c corresponds to the animation template a.

S902: In response to the select operation, the mobile phone selects the template option c, and highlights the template option c on the screen a.

For example, the select operation is a tap operation by the user on the template option c. The mobile phone may receive a tap operation by the user on a template option c 1002 in a screen a 1001 shown in (a) of FIG. 10. The tap operation is used to trigger the mobile phone to select the animation template of "sweet time", that is, the animation template of "sweet time" is the animation template a. The animation template of "sweet time" is an animation template corresponding to template option c 1002. In response to a tap operation by the user on the template option c 1002 in the screen a 1001 shown in (a) of FIG. 10, the mobile phone may display a screen a 1003 shown in (b) of FIG. 10, and the screen a 1001 highlights the template option c 1004.

It should be noted that a default highlight in the screen a is a template option located at the first or middle position in the screen a. For example, the screen a 603 shown in (b) of FIG. 6 includes four template options. The first template option 604 is highlighted by default. Therefore, in a specific implementation, if the animation template a is an animation template corresponding to the template option at the first or middle position, S901 and S902 may be omitted.

S903: The mobile phone receives a tap operation on the control d by the user.

Figure 10:
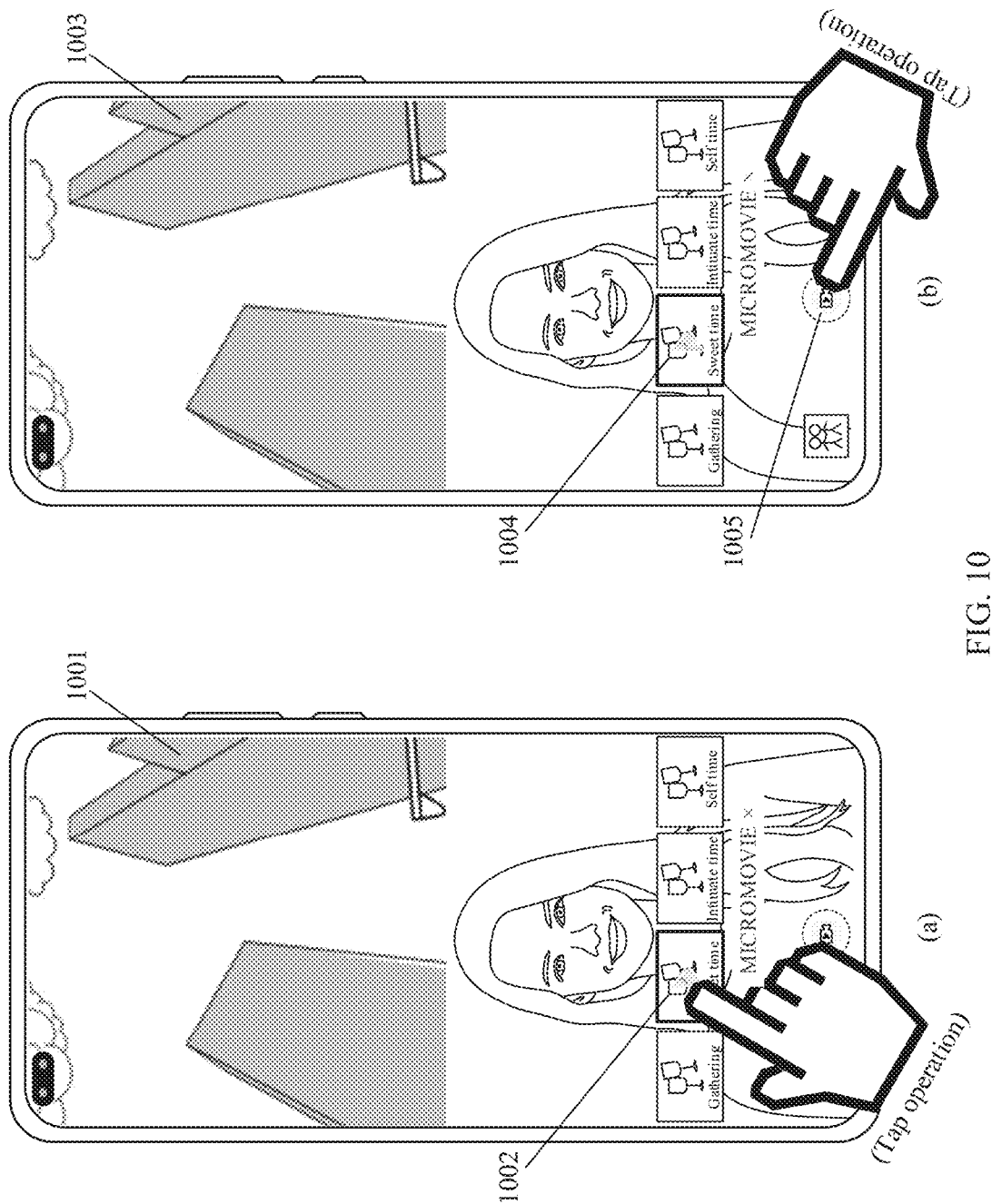
FIG. 10 is a schematic diagram of another video recording screen of a mobile phone according to an embodiment of this application.

For example, the mobile phone may receive a tap operation by the user on a control d 1005 in a screen a 1003 shown in (b) of FIG. 10. The tap operation is used to trigger the mobile phone to play the animation template of "sweet time", that is, the animation template of "sweet time" is the animation template a. The animation template of "sweet time" is an animation template corresponding to template option c 1004. It should be noted that the shape and position of the control d 1005 shown in (b) of FIG. 10 are only an example, and are not limited thereto in actual implementation. For example, the shape of the control d may alternatively be a rounded rectangle including a camera icon. For another example, the control d may alternatively be provided in a lower right corner of the screen a.

S904: In response to the tap operation on the control d by the user, the mobile phone may display a screen b.

It can be seen that, in this embodiment, in response to a select operation by the user on the template option c, the mobile phone selects the animation template a corresponding to the template option c. Then, the mobile phone may trigger playing of the animation template a in response to a tap operation by the user on the control d in the screen a. In this way, playing of the animation template a can be triggered only after the user accurately selects the corresponding template option, thereby improving orderliness of triggering and playing.

In S503, the operation b includes a select operation by the user on the template option c and a tap operation on the control d. In response to a tap operation by the user on a control d 1005 shown in (b) of FIG. 10, the mobile phone may display a screen b 1101 shown in (a) of FIG. 11. The screen b 1101 includes a window a 1102. The window a 1102 is used to play the animation template a.

Figure 11:
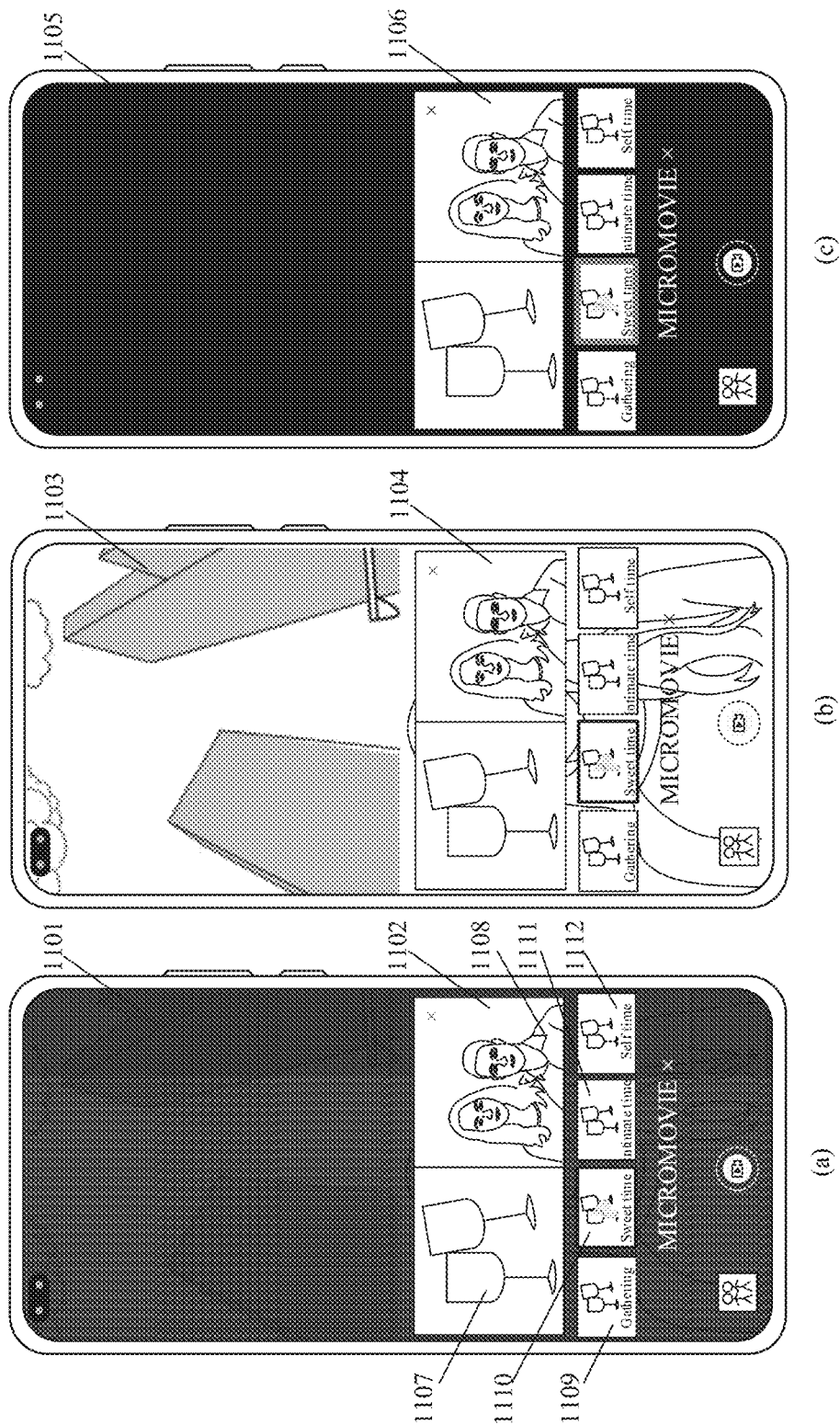
FIG. 11 is a schematic diagram of another video recording screen of a mobile phone according to an embodiment of this application.

It should be understood that the screen b shown in (a) of FIG. 11 is only an example. The screen b is obtained by adding a mask layer (for example, a gray mask layer) on top of a real-time image in the screen a, displaying a plurality of template options, the control d, and other screen elements on top of the mask layer, and displaying the window a on top of the mask layer. However, actual implementation is not limited thereto.

In some embodiments, the screen b may be a viewfinder screen before dual-cam video recording starts. Different from the screen a, the screen b includes the window a. For example, the screen b may be a screen b 1103 shown in (b) of FIG. 11. The screen b 1103 includes a window a 1104, and the window a 1104 is used to play the animation template a.

In some other embodiments, the screen b may be a screen with a preset background. For example, the preset background may be a solid color background. A screen b 1105 shown in (c) of FIG. 11 is a screen with a solid black background. The screen b 1105 includes a window a 1106, and the window a 1106 is used to play the animation template a.

It should be understood that the shapes and positions of the window a 1102 shown in (a) of FIG. 11, the window a 1104 shown in (b) of FIG. 11, and the window a 1106 shown in (c) of FIG. 11 are only examples. However, actual implementation is not limited thereto. In some embodiments, the window a may be a full-screen window. In this way, the animation template may be restored one by one in the process of playing the animation template. In some other embodiments, the shape of the window a is adapted to an orientation of a screen to which the animation template a is applicable. In this way, it is convenient to instruct the user to adjust the screen orientation. For example, the animation template a is applicable to animation processing on a video recorded in a landscape mode, and the shape of the window a is a rectangle whose width value is greater than a height value. For another example, the animation template a is applicable to animation processing on a video recorded in a portrait mode, and the shape of the window a is a rectangle whose width value is less than a height value.

In some embodiments, the window a includes a first sub-window and a second sub-window, where the first sub-window is used to play a sub-template a, and the second sub-window is used to play a sub-template b. A display layout of the first sub-window and the second sub-window matches a display layout applicable to the animation template a. In this way, it is convenient to specify the display layout applicable to the animation template a. The sub-template a may also be referred to as the first sub-template, and the sub-template b may also be referred to as the second sub-template.

In this embodiment, before displaying the screen b, the mobile phone monitors a display layout b applicable to the animation template a, where the display layout b includes a top-bottom display layout, a left-right display layout, a landscape picture-in-picture display layout, or a portrait picture-in-picture display layout. Then, S503 further includes: in response to an operation b, the mobile phone displays the screen b. The screen b includes a window a, the window a includes a first sub-window and a second sub-window; and the first sub-window and the second sub-window are displayed in a first display layout.

For example, in response to a tap operation by the user on the control d 1005 in the screen a 1003 shown in (b) of FIG. 10, the mobile phone may display the screen b 1101 shown in (a) of FIG. 11, and the screen b 1101 includes the window a 1102. The window a 804 includes a first sub-window 1107 and a second sub-window 1108, where the first sub-window 1107 and the second sub-window 1108 are displayed in a left-right display layout, indicating that an animation template corresponding to the template option c 1004 in (b) of FIG. 10 is applicable to a scenario in which preview streams corresponding to two cameras are displayed in a left-right layout in the landscape mode.

In some embodiments, the screen b further includes a plurality of template options, so that the user can reselect the animation template a in the screen b. In this way, there is no need to return to the screen a, but switching of the animation template can be performed on the screen b. For example, the screen b 1101 shown in (a) of FIG. 11 includes a plurality of template options, namely, a template option 1109, a template option 1110, a template option 1111, and a template option 1112.

S504. In response to an operation c by the user on the screen b, the mobile phone uses the animation template a to process a real-time image a collected by a camera c and a real-time image b collected by a camera d, so as to shoot a micro-movie, where the camera c is one camera in the plurality of cameras, and the camera d is one camera other than the camera c in the plurality of cameras.

The operation c may also be referred to as a third operation, the camera c may also be referred to as a first camera, the real-time image a may also be referred to as a first real-time image, the camera d may also be referred to as a second camera, and the real-time image b may also be referred to as a second real-time image.

Before S504, the mobile phone may receive an operation c by the user on the screen b, and the operation c may be a preset gesture c by the user on the screen b. For example, the preset gesture c is a right-to-left slide gesture on the screen b; or the screen b includes a control e, where the control e is used to trigger the mobile phone to start shooting a micro-movie. The operation c may be a trigger operation (for example, a tap operation or a touch-and-hold operation) on the control e. For example, the operation c may be a tap operation by the user on a control e 1202 in a screen b 1201 shown in (a) of FIG. 12.

In response to the operation c by the user on the screen b, the mobile phone may use the animation template a to perform animation processing, so as to complete recording of the micro-movie. For example, animation processing is performed on the real-time image a collected by the camera c and the real-time image b collected by the camera d, so as to achieve the animation effect of the animation template a.

In some embodiments, different animation templates are applicable to animation processing on preview images collected by different cameras. In short, different animation templates are applicable to different cameras. The camera c and the camera d are two cameras to which the animation template a is applicable.

Figure 13:
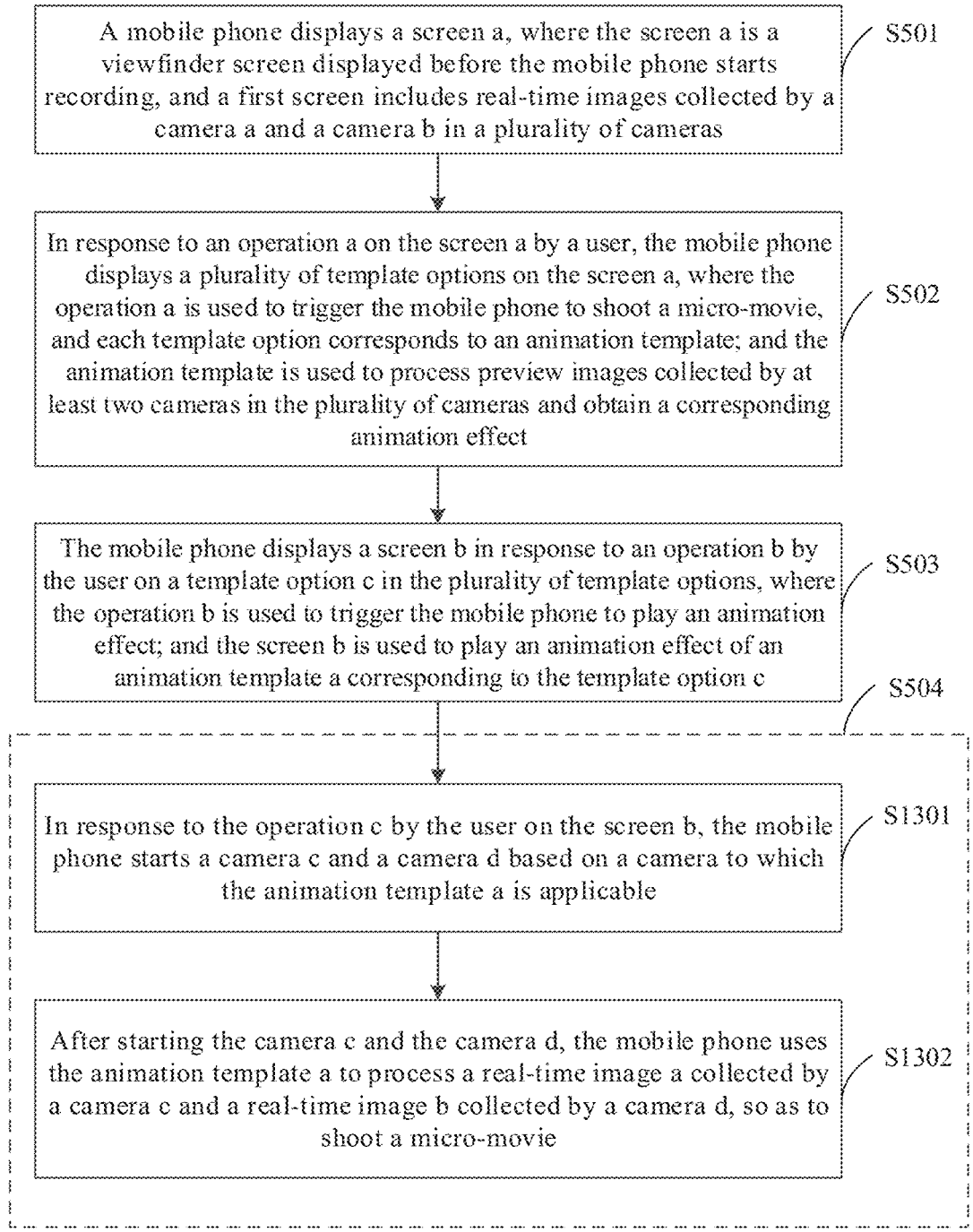
FIG. 13 is a flowchart of another video shooting method according to an embodiment of this application.

Based on this, as shown in FIG. 13, in this embodiment, S504 further includes S1301 and S1302.

S1301: In response to the operation c by the user on the screen b, the mobile phone starts the camera c and the camera d based on a camera to which the animation template a is applicable.

The camera c and camera d to which the animation template a is applicable may be a combination of any two cameras of the front-facing camera, the rear-facing main camera, the rear-facing wide-angle camera, the rear-facing ultra-wide-angle camera, and the rear-facing telephoto camera.

Usually, the mobile phone may query attribute information of the animation template a to obtain a camera to which the animation template a is applicable.

S1302: After starting the camera c and the camera d, the mobile phone uses the animation template a to process the real-time image a collected by the camera c and the real-time image b collected by the camera d, so as to shoot a micro-movie.

In this way, a matching degree between a camera in use and a camera to which the animation template is applicable can be increased, thereby improving an effect of animation processing.

It should be noted that in this embodiment, the camera c may be the same as the camera a or camera b, or may be different from both the camera a and camera b; and the camera c may be the same as the camera a or camera b, or may be different from both the camera a and camera b.

In some other embodiments, the camera c and the camera d are cameras that have been turned on before recording preparation is started. For example, the camera c is the camera a that has been turned on, and the camera d is the camera b that has been turned on. In this way, after the operation c is received, the two cameras that have been turned on may be directly used as the camera c and the camera d, thereby reducing a process of determining a camera and quickly proceeding to animation processing.

To sum up, according to the video shooting method in this embodiment of this application, in a dual-cam video recording scenario, animation processing on real-time images collected by two cameras can be performed based on the animation template selected by the user, to obtain a micro-movie with an animation effect. In this way, micro-movie recording in the dual-cam video recording scenario can be implemented, so as to record rich dual-cam video content. In addition, the user does not need to control complex operations such as framing, thereby reducing difficulties in recording micro-movies.

In the description of the following embodiments, it should be noted first that generally, a micro-movie includes a plurality of movie clips. Correspondingly; the animation template a includes a plurality of animation sub-templates, and the plurality of movie clips are in one-to-one correspondence to the plurality of animation sub-templates. Each animation sub-template is used for animation processing on a real-time image collected in a corresponding movie clip, so as to obtain a micro-movie with richer animation effects through processing.

In some embodiments, in order to perform, in a targeted manner, animation processing on real-time images collected by different cameras, each animation sub-template further includes a sub-template a and a sub-template b. The sub-template a is used for performing animation processing on the real-time image a by the mobile phone, and the sub-template b is used for performing animation processing on the real-time image b by the mobile phone. In this way, corresponding sub-templates can be used for performing processing for different cameras. Therefore, different animation effects can be obtained by processing preview images of a same moment, further improving a processing effect. The sub-template a may also be referred to as the first sub-template, and the sub-template b may also be referred to as the second sub-template.

Figure 14A:
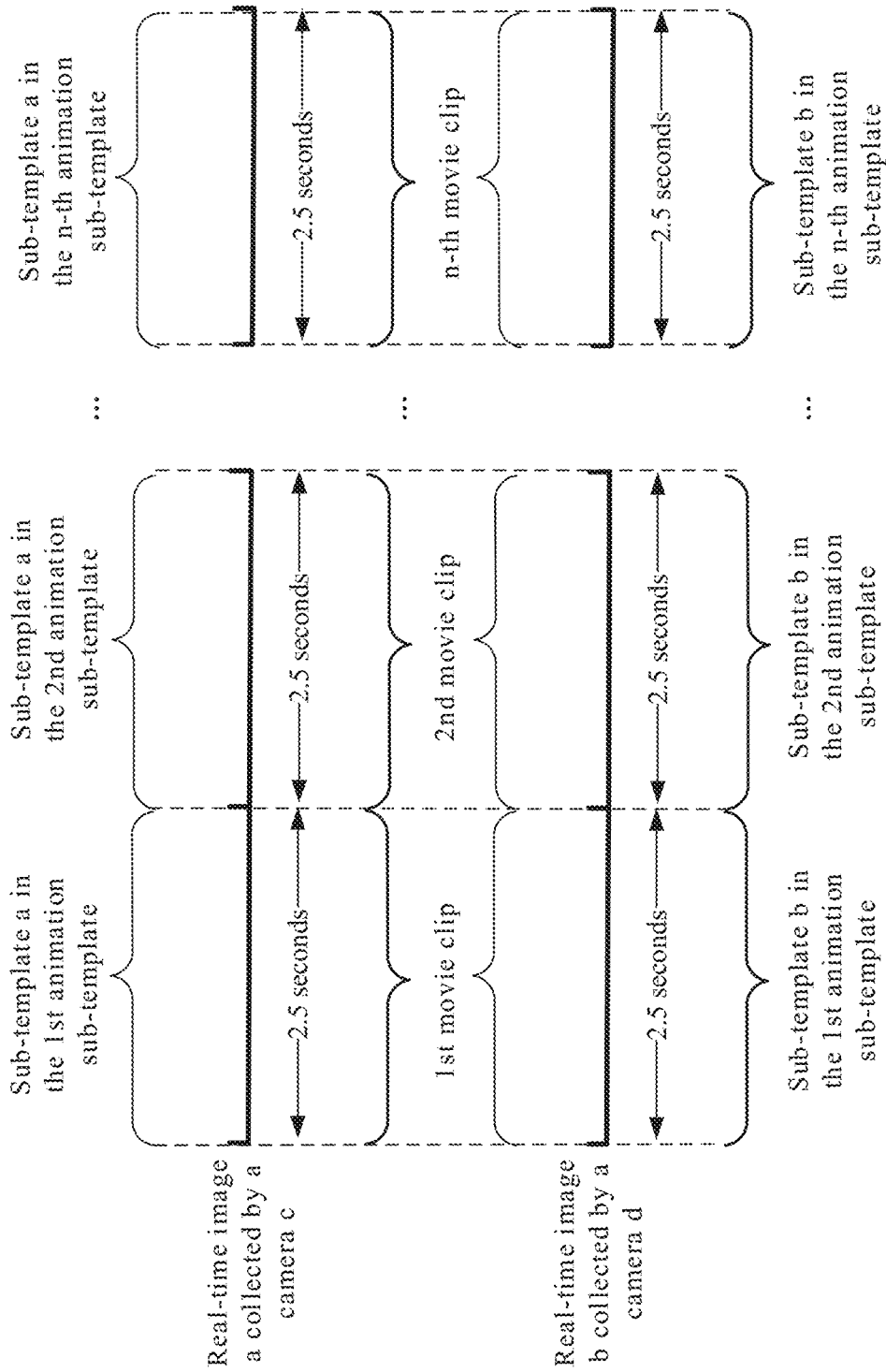
FIG. 14a is a schematic diagram of composition of a video file according to an embodiment of this application.

For example, the animation template a includes n animation sub-templates, namely, the 1st animation sub-template, the 2nd animation sub-template, . . . , and the n-th animation sub-template. Each animation sub-template includes a sub-template a and a sub-template b. It is assumed that each movie clip is 2.5 seconds. As shown in FIG. 14*a*, the 1st animation sub-template is used for animation processing on the 1st movie clip (for example, the 1st 2.5 seconds), specifically, a sub-template a in the 1st animation sub-template is used for animation processing on a real-time image a collected by the camera c in the 1st movie clip, and a sub-template b in the 1st animation sub-template is used for animation processing on a real-time image b collected by the camera d in the 1st movie clip. Similarly, the 2nd animation sub-template is used for animation processing on the 2nd movie clip (for example, the 2nd 2.5 seconds), specifically, a sub-template a in the 2nd animation sub-template is used for animation processing on a real-time image a collected by the camera c in the 2nd movie clip, and a sub-template b in the 2nd animation sub-template is used for animation processing on a real-time image b collected by the camera d in the 2nd movie clip; . . . ; and the n-th animation sub-template is used for animation processing on the n-th movie clip (for example, the n-th 2.5 seconds), specifically, a sub-template a in the n-th animation sub-template is used for animation processing on a real-time image a collected by the camera c in the n-th movie clip, and a sub-template b in the n-th animation sub-template is used for animation processing on a real-time image b collected by the camera d in the n-th movie clip.

Figures 1, 14B:
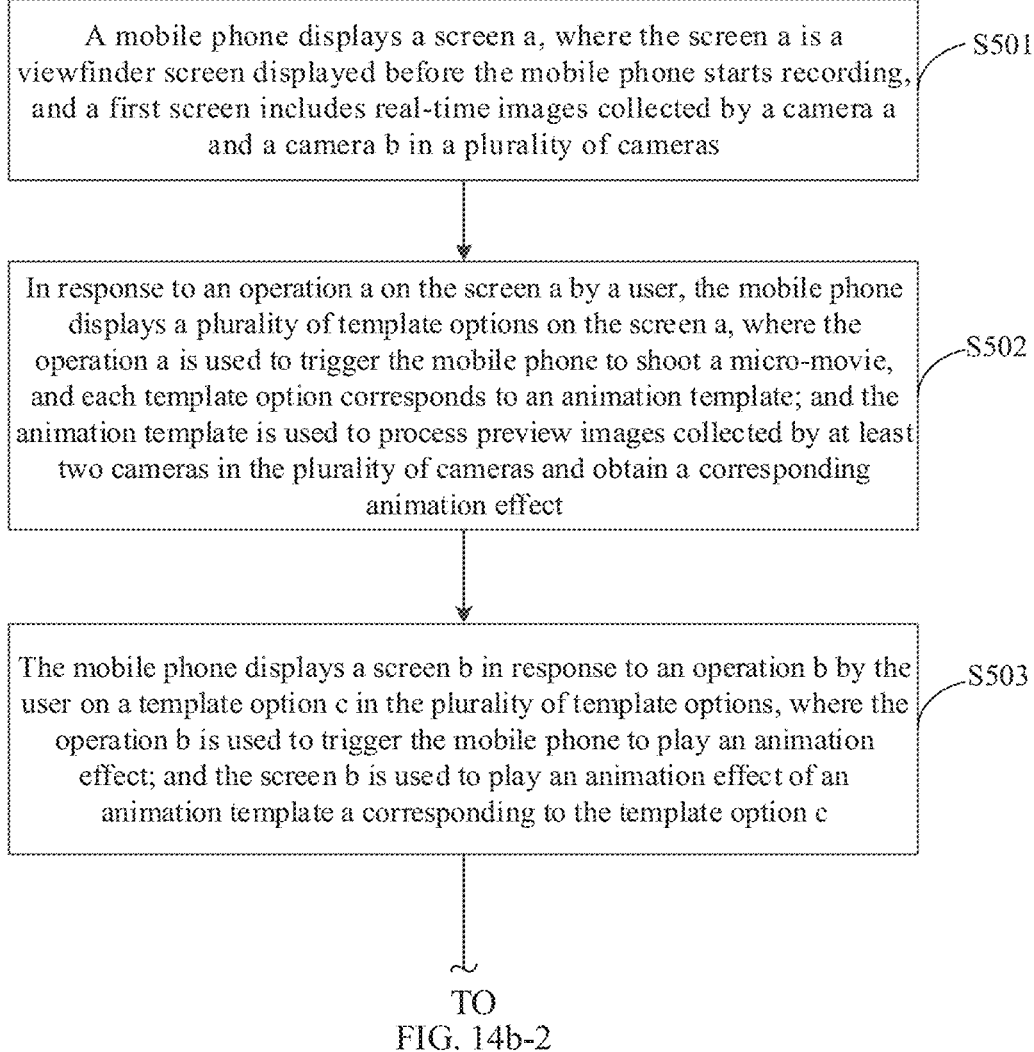
Figures 2, 14B:
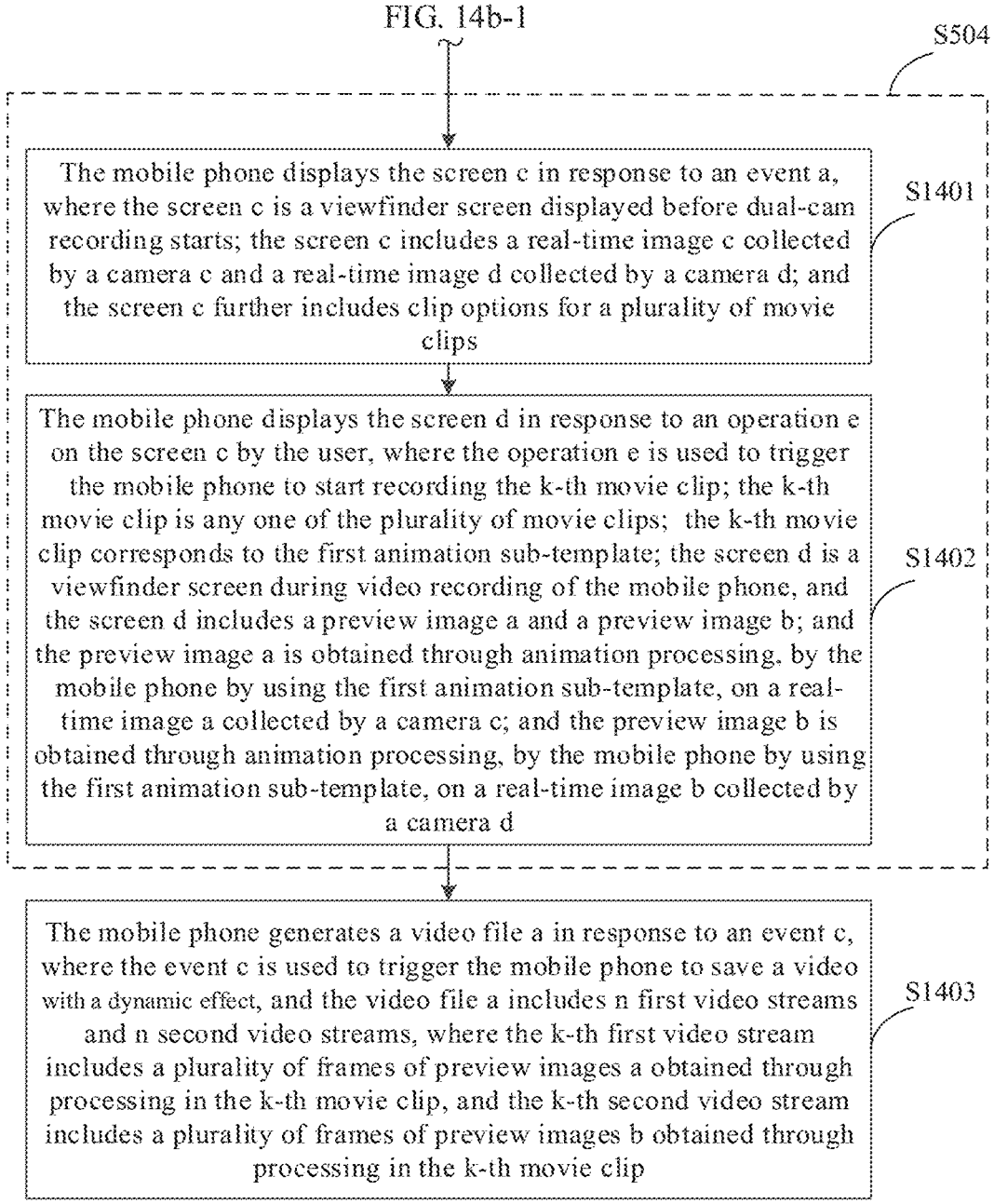

In some other embodiments, as shown in FIG. 14*b*-1 and FIG. 14*b*-2, S504 in the foregoing embodiment further includes S1401 and S1402, and after S504, S1403 is further included:

S1401: The mobile phone displays the screen c in response to an event a, where the screen c is a viewfinder screen displayed before dual-cam recording starts; the screen c includes a real-time image c collected by the camera c and a real-time image d collected by the camera d; and the screen c further includes clip options for a plurality of movie clips.

The screen c may also be referred to as a third screen, the real-time image c may be referred to as a third real-time image, and the real-time image d may be referred to as a fourth real-time image. It should be noted that there is no essential difference between the real-time image c and the real-time image a, both are real-time images collected by the camera c, and are real-time images collected by the camera in different time periods. The real-time image a is a real-time image collected during recording of the movie clip, and the real-time image c is a real-time image collected during recording preparation of the movie clip (that is, when the screen c is displayed). Similarly, there is no essential difference between the real-time image d and the real-time image b, for the same reasons as above.

The screen c is a viewfinder screen displayed before dual-cam recording starts. That is, when the screen c is displayed, recording does not actually start. Therefore, in the process of displaying the screen c, the mobile phone can adjust framing in response to movement of the mobile phone by the user. Framing changes during adjustment are not recorded into a video. In this embodiment, the process of adjusting framing is referred to as recording preparation.

Herein, it should be noted that there are two cases in which the screen c is displayed. In case 1, the mobile phone jumps from the screen b to the screen c in response to the operation c by the user on the screen b. That is, in case 1, the event a is the operation c by the user on the screen b. In case 2, the mobile phone jumps back to the screen c in response to an event that recording of the k-th movie clip is completed, where 1≤k≤n, and n is the number of animation sub-templates included in the animation template a. Both k and n are positive integers. That is, in case 2, the event a is the event that recording of the k-th movie clip is completed, and the event a at this time may also be referred to as a first event. S1401 is described below for these two cases.

In case 1, the screen b is jumped to the screen c. In this case, the event a may be the operation c on the screen b by the user, and the operation c is used to trigger the mobile phone to start recording preparation.

Before 1401, the mobile phone may receive the operation c on the screen b by the user.

The operation c may be a preset gesture c by the user on the screen b. For example, the preset gesture c is a right-to-left slide gesture on the screen b; or, the screen b includes a control e, where the control e is used to trigger the mobile phone to start recording preparation. The operation c may be a trigger operation (for example, a tap operation or a touch-and-hold operation) on the control e. For example, the operation c may be a tap operation by the user on a control e 1202 in a screen b 1201 shown in (a) of FIG. 12.

Figure 12:
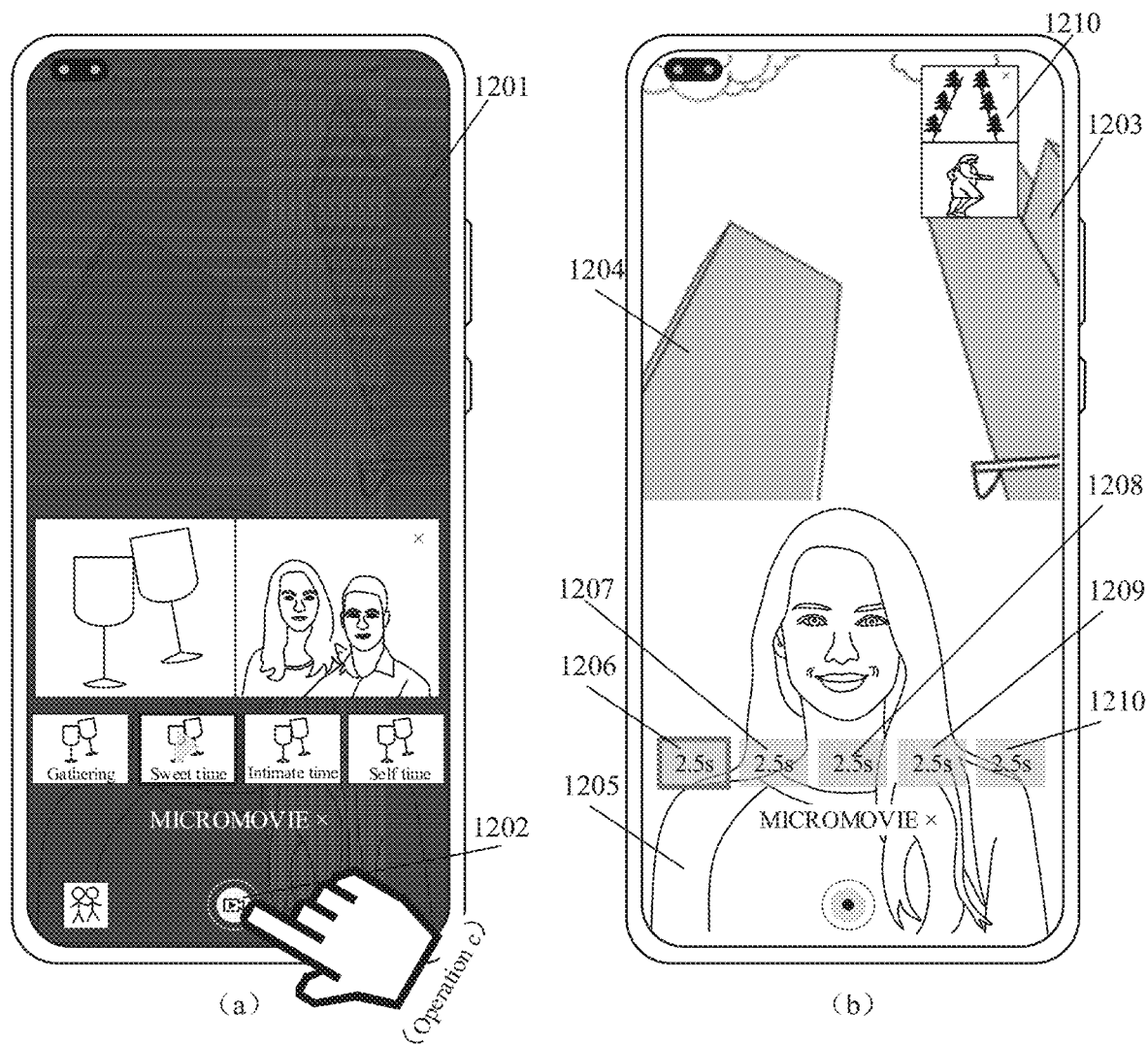
FIG. 12 is a schematic diagram of another video recording screen of a mobile phone according to an embodiment of this application.

For example, in response to a tap operation by the user on the control e 1202 in the screen b 1201 shown in (a) in FIG. 12, the mobile phone may display a screen c 1203 shown in (b) of FIG. 12, and the screen c 1203 is a viewfinder screen displayed before dual-cam recording starts. The screen c 1203 includes a real-time image c 1204 collected by the camera c (for example, the rear-facing camera) and a real-time image d 1205 collected by the camera d (for example, the front-facing camera). The screen c 1203 further includes clip options for five movie clips, namely, a clip option 1206, a clip option 1207, a clip option 1208, a clip option 1209, and a clip option 1210.

It should be understood that the shapes, quantity, and positions of the clip options shown in (b) of FIG. 12 are only an example. However, actual implementation is not limited thereto. For example, clip duration (for example, 2.5 s) may not be displayed in the clip options. For another example, the clip option may alternatively be in a shape of a circle, a square, or the like. The number of clip options varies with the number of animation sub-templates included in the animation template a.

In case 2, after recording of the k-th (where 1≤k≤n, and k is a positive integer) movie clip is completed, the screen c is displayed again. In this case, the event a may be the event that recording of the k-th movie clip is completed. For example, when a recording countdown timer (for example, 2.5 s) of the k-th movie clip expires, the event a is triggered. The k-th movie clip recorded each time may also be referred to as a first movie clip.

Before S1401, the mobile phone may detect whether the recording countdown timer of the k-th movie clip expires. If it is detected that the recording countdown timer expires, the screen c is displayed.

In this case, when the screen c is displayed, recording of k movie clips has been completed. In some embodiments, in order to distinguish between movie clips recorded completely and movie clips not yet recorded completely, the clip option a and the clip option b are displayed differently in the screen c. Each clip option a corresponds to one movie clip recorded completely, and each clip option b corresponds to one movie clip not yet recorded completely. Specifically, the screen c includes p clip options a and q clip options b. p≥0, q≥0, and both p and q are natural numbers. Generally, p=k, and q=n−k. The clip option a may also be referred to as a first clip option, and the clip option b may also be referred to as a third clip option.

In a specific implementation, the clip option a includes a clip cover, and the clip option b does not include a clip cover, so as to distinguish between movie clips recorded completely and movie clips not yet recorded completely.

Figure 15:
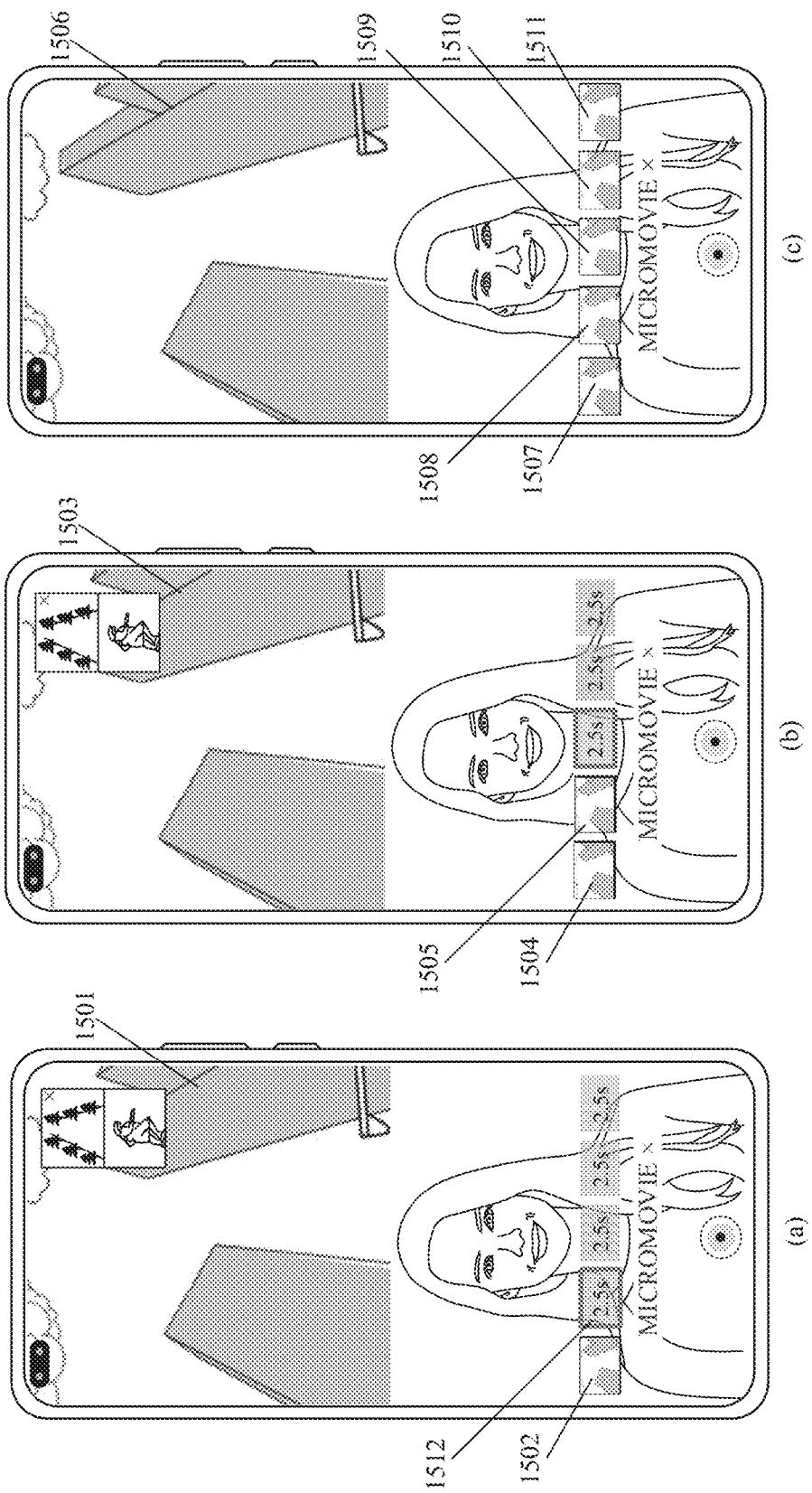
FIG. 15 is a schematic diagram of another video recording screen of a mobile phone according to an embodiment of this application.

For example, if k=1, the mobile phone may display a screen c 1501 shown in (a) of FIG. 15. In the screen c 1501, a clip option a 1502 pointing to the 1st movie clip is displayed with a cover, and remaining clip options are displayed without covers.

For another example, if k=2, the mobile phone may display a screen c 1503 shown in (b) of FIG. 15. In the screen c 1503, a clip option a 1504 pointing to the 1st movie clip and a clip option a 1505 pointing to the 2nd movie clip are both displayed with covers, and remaining clip options are displayed without covers.

For another example, if k=5, the mobile phone may display a screen c 1506 shown in (c) of FIG. 15. All clip options on the screen c 1506 are clip options a, and correspondingly, a clip option a 1507, a clip option a 1508, a clip option a 1509, a clip option a 1510, and a clip option a 1511 are all displayed with covers.

It should be noted that the cover may be selected from a video frame included in a movie clip pointing to the clip option a. For example, the cover may be the first frame of preview image or the last frame of preview image of a corresponding movie clip.

It should be noted that the foregoing two cases occur successively in the process of micro-movie recording, where case 1 corresponds to a case of entering the screen c for the first time during micro-movie recording, and case 2 corresponds to a case of entering the screen c again during micro-movie recording.

In some embodiments of the foregoing two cases, the screen c further includes a window b, and the window b is used to play animation of all animation sub-templates in the animation template a. Specifically, an animation effect of a animation sub-template (for example, the first animation sub-template) corresponding to a movie clip to be recorded is played in the window b. In this way, at the recording preparation stage, framing of the movie clip to be recorded is adjusted by referring to the animation effect played in the window b. The window b may also be referred to as a first window.

For example, as shown in (a) of FIG. 15, the second clip option is currently selected, indicating that the second movie clip is about to be recorded. Therefore, an animation effect of an animation sub-template corresponding to the first movie clip is played in a window b 1602 in a screen c 1601.

It should be noted that in a case in which all the movie clips have been recorded completely, there is no need to adjust framing and then the window b is no longer displayed in the screen c. For example, the window b is not included in the screen c 1506 shown in (c) of FIG. 15.

Figure 16:
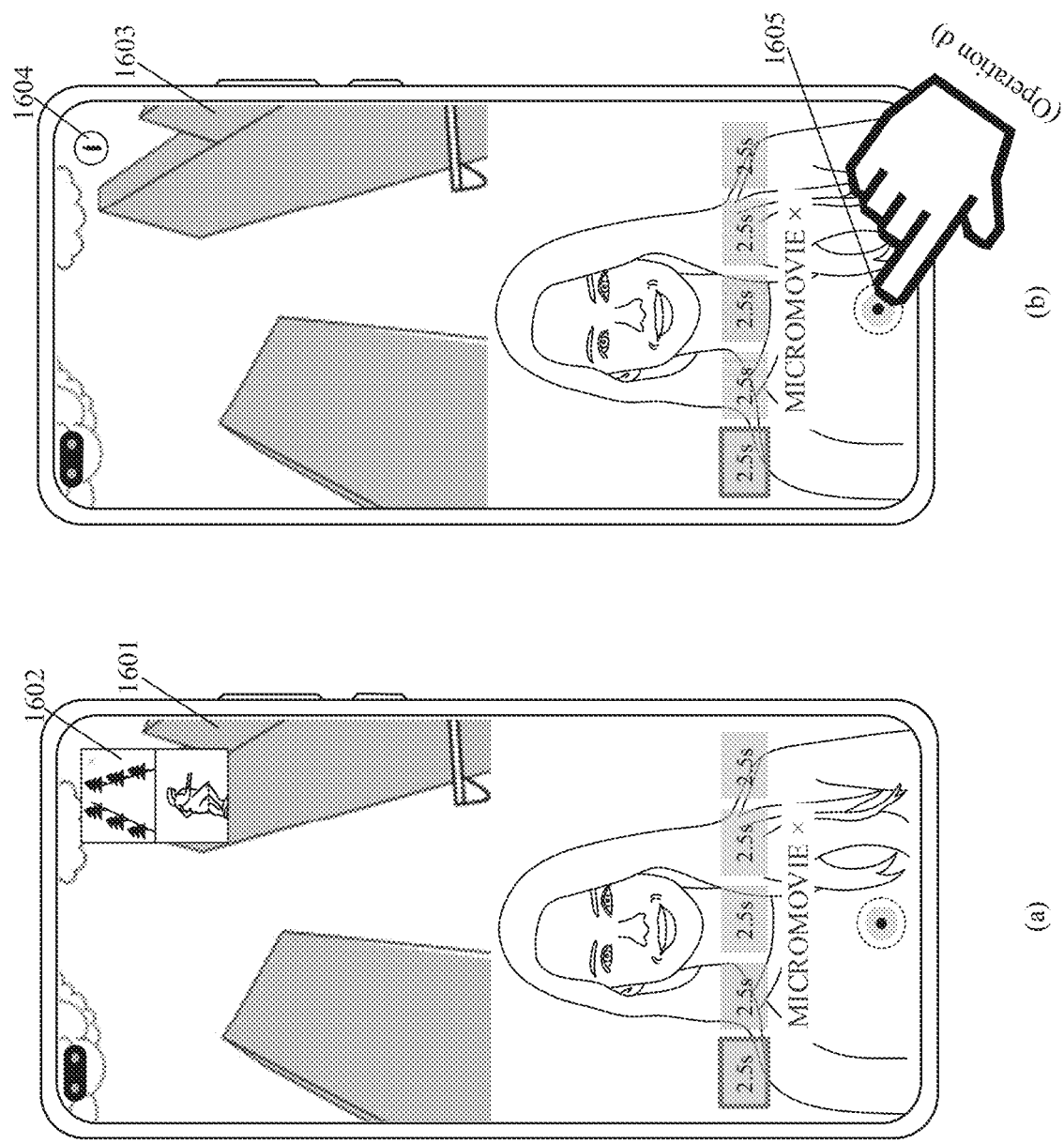
FIG. 16 is a schematic diagram of another video recording screen of a mobile phone according to an embodiment of this application.

In addition, in this embodiment, the mobile phone may hide the window b in response to a close operation on the window b by the user, thereby simplifying screen elements and facilitating preview. For example, in response to a tap operation by the user on a close button "x" in an upper right corner of the window b 1602 in the screen c 1601 shown in (a) of FIG. 16, the mobile phone may display the screen c 1603 shown in (b) of FIG. 16, and a hide identifier 1604 is present on the screen c 1603. The hide identifier 1604 is used to trigger to display the window b 1602 again. That is, the hide identifier 1604 is hidden in the window b 1602.

After the mobile phone displays the screen c, recording preparation may be performed in the screen c. After preparation is completed, dual-cam recording may be triggered. A plurality of movie clips are recorded in sequence, and animation processing needs to be performed, by using the animation sub-templates in sequence, on real-time images collected in each movie clip. Specifically, for the k-th movie clip, the recording process is described in the following S1402.

S1402: The mobile phone displays the screen d in response to an operation d on the screen c by the user, where the operation d is used to trigger the mobile phone to start recording the k-th movie clip, the k-th movie clip is any one of the plurality of movie clips; the k-th movie clip corresponds to the first animation sub-template; the screen d is a viewfinder screen during video recording of the mobile phone, and the screen d includes a preview image a and a preview image b; and the preview image a is obtained through animation processing, by the mobile phone by using the first animation sub-template, on a real-time image a collected by the camera c; and the preview image b is obtained through animation processing, by the mobile phone by using the first animation sub-template, on a real-time image b collected by the camera d.

The operation d may also be referred to as a fourth operation, the screen d may also be referred to as a fourth screen, the k-th movie clip may also be referred to as a first movie clip, the preview image a may also be referred to as a first preview image, and the preview image b may also be referred to as a second preview image.

Before S1402, the mobile phone needs to determine the k-th movie clip to be recorded. Specifically, the mobile phone selects a clip option c in response to an event b. The clip option c is one of q clip options b. The clip option c corresponds to one movie clip not yet recorded completely, that is, the k-th movie clip. The event b may also be referred to as a third event, and the clip option c may also be referred to as a fourth clip option.

In some embodiments, the k-th movie clip may be automatically selected by the mobile phone. That is, the event b is an event that the mobile phone automatically selects the clip option c. For example, based on a sequence of the plurality of movie clips, the mobile phone sequentially selects the 1st movie clip, the 2nd movie clip, . . . , and the n-th movie clip as the k-th movie clip to be recorded; and the clip option c corresponding to the k-th movie clip is highlighted on the screen c. In this way, all movie clips may be recorded in sequence, so that a recording time sequence is consistent with the sequence of the movie clips.

In this embodiment, the operation d may be a preset gesture c by the user on the screen c. For example, the preset gesture c is a slide-up gesture on the screen c 1603 shown in (b) of FIG. 16; or the screen c includes a control f, where the control f is used to trigger the mobile phone to start dual-cam recording. The operation d may be a trigger operation (for example, a tap operation or a touch-and-hold operation) on the control f. For example, the operation d may be a tap operation by the user on a control f 1605 in the screen c 1603 shown in (b) of FIG. 16. The control f may also be referred to as a first control.

In some other embodiments, the k-th movie clip is manually selected by the user. That is, the event b may be a manual selection operation on the clip option c by the user. For example, in response to a select operation by the user on the 3rd clip option (that is, the clip option c is the 3rd clip option), the mobile phone may determine that the k-th movie clip to be recorded is the 3rd movie clip.

In this embodiment, the operation d may be a select operation on the clip option c by the user; or the operation d may be a preset gesture c by the user on the screen c in a case that the clip option c is selected. For example, the preset gesture c is a slide-up gesture on the screen c 1603 shown in (b) of FIG. 16; or the screen c includes a control f, where the control f is used to trigger the mobile phone to start dual-cam recording. The operation d may be a trigger operation (for example, a tap operation or a touch-and-hold operation) on the control f.

Figure 17:
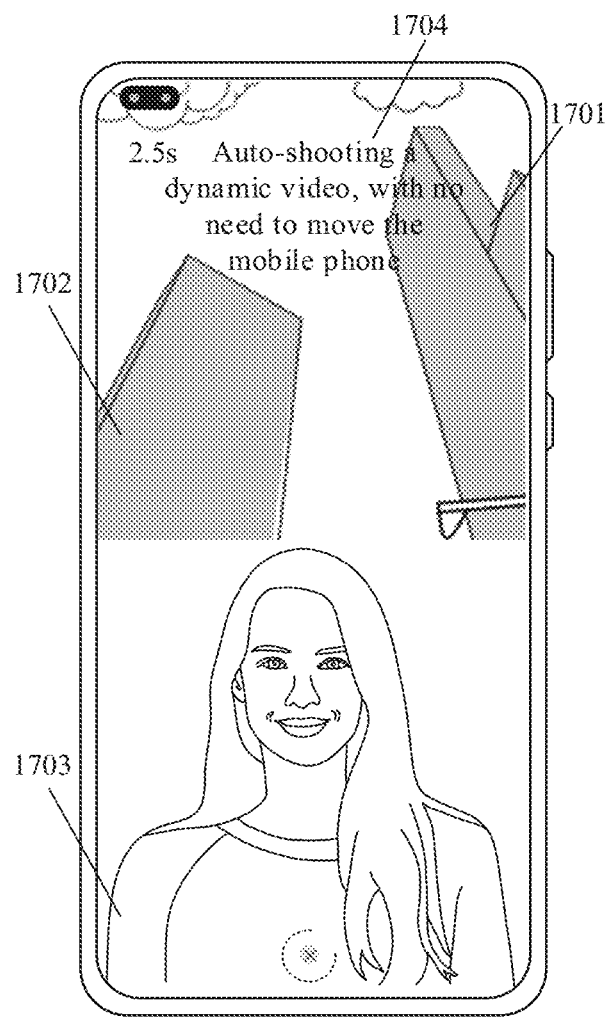
FIG. 17 is a schematic diagram of another video recording screen of a mobile phone according to an embodiment of this application.

In S1402, for example, k=1 is used as an example. In response to a tap operation by the user on the control f 1605 in the screen c 1603 shown in (b) of FIG. 16, the mobile phone may display a screen b 1701 shown in FIG. 17. The screen d 1701 includes a preview image a 1702 and a preview image b 1703. The preview image a 1702 is obtained through animation processing, by the mobile phone by using a sub-template a of the first animation sub-template, on a real-time image a collected by the camera c; and the preview image b 1703 is obtained through animation processing, by the mobile phone by using a sub-template b of the first animation sub-template, on a real-time image b collected by the camera d.

The preview image a and the preview image b displayed on the screen d are both preview images obtained through animation processing. In this way, during recording, an effect after animation processing can be viewed in real time on the screen d.

In some embodiments, the screen d further includes prompt information a, where the prompt information a is used to prompt a technique for recording a dynamic video. For example, the screen d 1701 shown in FIG. 17 includes prompt information a 1704, and specific content of the prompt information a 1704 is: Auto-shoot dynamic video; do not move the mobile phone.

In some embodiments, the screen d further includes a recording countdown timer of the k-th movie clip. In this way, remaining recording duration of the k-th movie clip can be clearly indicated.

In normal cases, during dual-cam video recording, in response to an operation f by the user, the mobile phone may exchange viewfinder frames of two cameras on the viewfinder screen, thereby implementing flexible exchange of real-time images. The operation f may also be referred to as a sixth operation.

However, in some embodiments of this application, in order to make preview on the screen d completely consistent with an animation effect of the animation sub-template corresponding to the k-th movie clip, the mobile phone shields the operation f by the user on the screen d. The operation f is used to trigger the mobile phone to exchange a viewfinder frame of the camera c and a viewfinder frame of the camera d on the screen d. In other words, the mobile phone does not respond to the operation f by the user on the screen d. This can avoid inconsistency between an obtained preview and the animation effect of the animation sub-template corresponding to the k-th movie clip resulting from exchange during animation processing, thereby improving consistency between previews before and after.

The operation f may be a double-tap operation on the preview image a or the preview image b, or a drag operation on the preview image a or the preview image b. The operation f being a double-tap operation on the preview image a or the preview image b is used as an example. The mobile phone does not respond to a double-tap operation by the user on the preview image a 1702 or the preview image b 1703 in the screen d 1701 shown in FIG. 17.

When a recording countdown timer of the k-th movie clip expires, the event a is triggered, and then S1401 is proceeded to display the screen c. Then, in response to an operation d by the user on the screen c, the mobile phone displays the screen d, and starts recording a next movie clip. The steps are repeated until recording of all n movie clips are finally completed, and then the cycle ends.

For ease of understanding on the cycling process, the process of S1401 and S1402 is described in detail below by using n=5 and a method of selecting clip options in sequence on the mobile phone as an example.

Recording the 1st movie clip: In response to a tap operation by the user on a control d 1202 in a screen b 1201 shown in (a) of FIG. 12, a screen c 1203 shown in (b) of FIG. 12 is displayed, so as to start recording preparation of the 1st movie clip. In response to a tap operation by the user on a control f in the screen c 1203 shown in (b) of FIG. 12, the mobile phone displays a screen d 1701 shown in FIG. 17. At that time, recording of the 1st movie clip starts, until a 2.5 s recording countdown timer expires to end recording of the 1st movie clip.

Recording the 2nd movie clip: In response to expiration of the 2.5 s recording countdown time of the 1st movie clip, the mobile phone displays the screen c 1501 shown in (a) of FIG. 15, and performs recording preparation for the 2nd movie clip. In response to a tap operation by the user on the control f in the screen c 1501 shown in (a) of FIG. 15, the mobile phone displays the screen d 1701 shown in FIG. 17. At that time, recording of the 2nd movie clip starts, until a 2.5 s recording countdown timer expires to end recording of the 2nd movie clip.

Recording the 3rd movie clip: In response to expiration of the 2.5 s recording countdown time of the 2nd movie clip, the mobile phone displays the screen c 1503 shown in (b) of FIG. 15, and performs recording preparation for the 3rd movie clip. In response to a tap operation by the user on the control f in the screen c 1503 shown in (b) of FIG. 15, the mobile phone displays a screen d 1701 shown in FIG. 17. At that time, recording of the 3rd movie clip starts, until a 2.5 s recording countdown timer expires to end recording of the 3rd movie clip.

The steps are repeated until recording of the 5th movie clip is completed. In response to expiration of a 2.5 s recording countdown time of the 5th movie clip, the mobile phone displays the screen c 1506 shown in (c) of FIG. 15.

S1403: The mobile phone generates a video file a in response to an event c; where the event c is used to trigger the mobile phone to save a video with a dynamic effect, and the video file a includes n first video streams and n second video streams, where the k-th first video stream includes a plurality of frames of preview images a obtained through processing in the k-th movie clip, and the k-th second video stream includes a plurality of frames of preview images b obtained through processing in the k-th movie clip.

The event c may also be referred to as a second event, and the video file a may also be referred to as a first video file.

Before S1403, the mobile phone may receive the event c. The event c may be an event automatically triggered by the mobile phone. For example, after recording of all the n movie clips is completed, the event a is triggered. For another example, after recording of all the n movie clips is completed, if the user does not perform any operation on the screen c within a preset time, the event c is triggered.

Alternatively the event c may be a user-triggered event. For example, after recording of all the n movie clips is completed, the screen c displayed by the mobile phone includes a control g, and the control g is used to trigger the mobile phone to save a video with a dynamic effect. The event c may be a trigger operation (for example, a tap operation or a touch-and-hold operation) on the control g by the user. For another example, after recording of all the n movie clips is completed, the screen c displayed by the mobile phone includes a control h, and the control h is used to trigger the mobile phone to display a control j and control j on the screen c. The control j is used to trigger the mobile phone to save a video with a dynamic effect, and the another control j is used to trigger the mobile phone to delete a video with a dynamic effect. The event c may be a trigger operation (for example, a tap operation or a touch-and-hold operation) on the control j.

Figure 18:
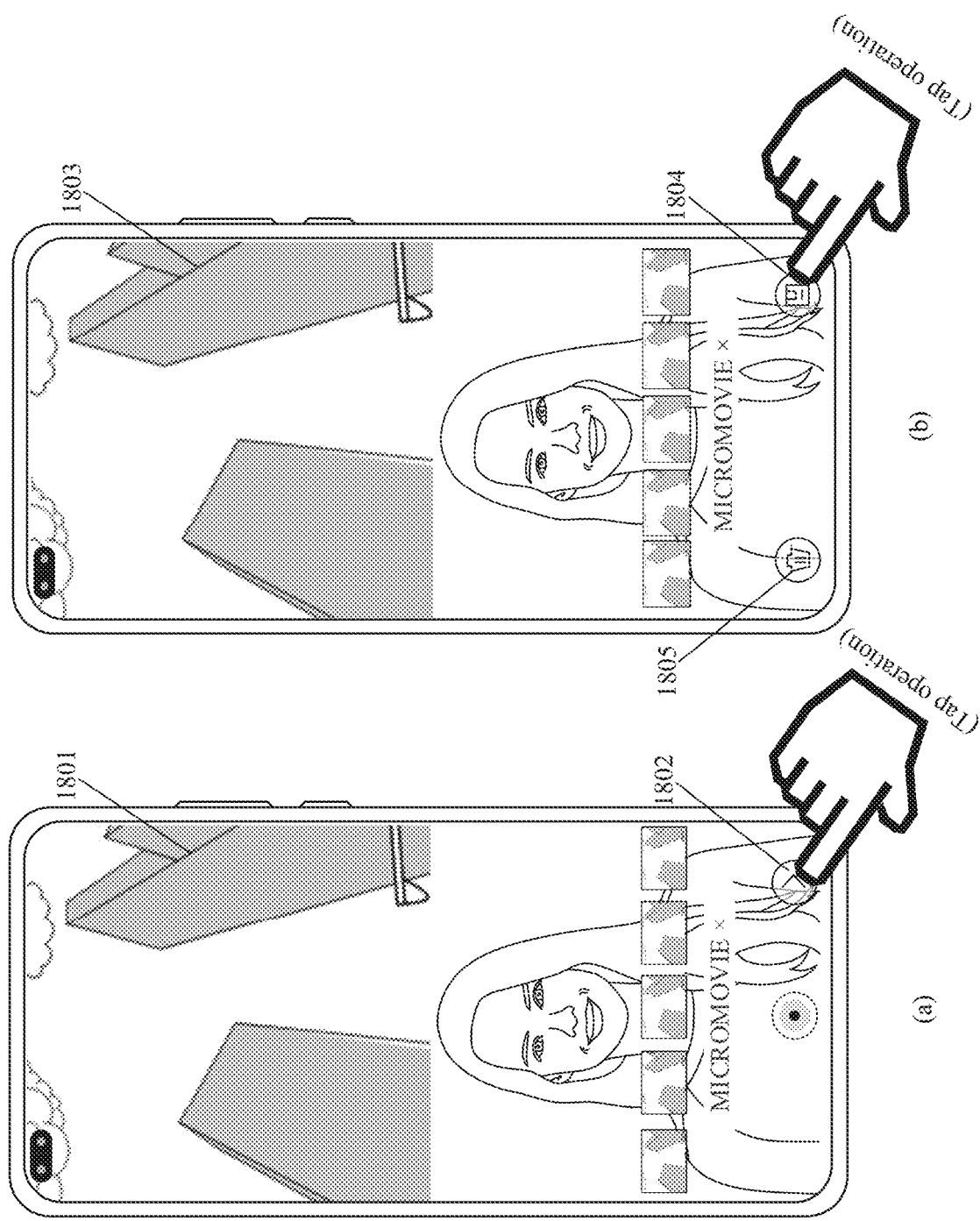
FIG. 18 is a schematic diagram of another video recording screen of a mobile phone according to an embodiment of this application.

For example, assuming n=5, after recording of all the five movie clips is completed, the mobile phone may display a screen c 1801 shown in (a) of FIG. 18. The screen c 1801 includes a control h 1802. The mobile phone may receive a tap operation on the control h 1802 by the user. In response to the tap operation on the control h 1802 by the user, the mobile phone may display a screen c 1803 shown in (b) of FIG. 18, and the screen c 1803 includes a control j 1804 and a control j 1805. The control j 1804 is used to trigger the mobile phone to save a video with a dynamic effect, and the control j 1805 is used to trigger the mobile phone to delete a video with a dynamic effect. The event c is a tap operation on the control j 1804.

The mobile phone generates a video file a in response to the event c. In some embodiments, in response to the event c, the mobile phone displays prompt information b on the screen c, where the prompt information b is used to prompt a progress of generating the video file. In this way, the generation progress can be visually displayed.

Figure 19:
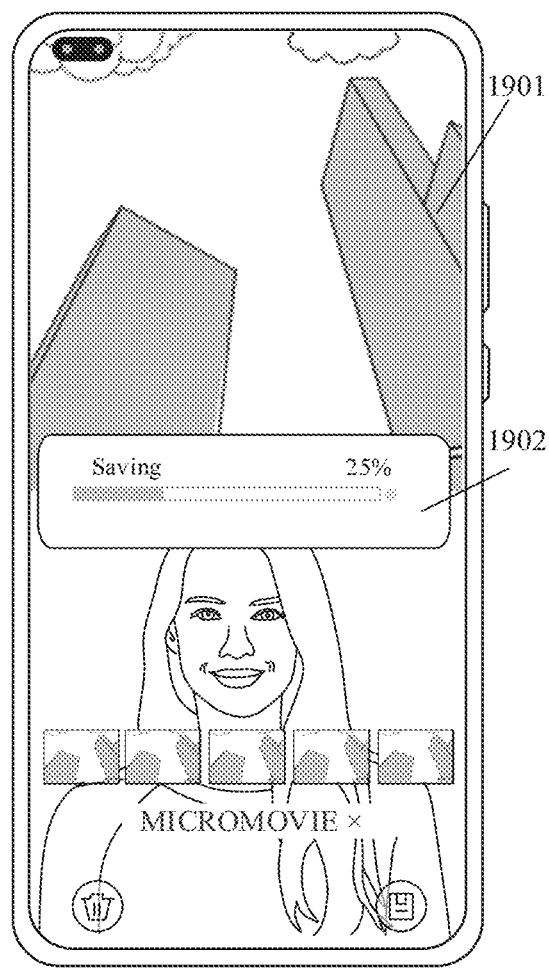
FIG. 19 is a schematic diagram of a video saving screen according to an embodiment of this application.

For example, the event c may be a tap operation by the user on the control j 1804 in the screen c 1803 shown in (b) of FIG. 18. In response to the tap operation by the user on the control i 1804, the mobile phone may display a screen c 1901 shown in FIG. 19. The screen c 1901 includes prompt information b 1902, and the prompt information b 1902 prompts a progress of generating the video file being 25%.

Figure 20:
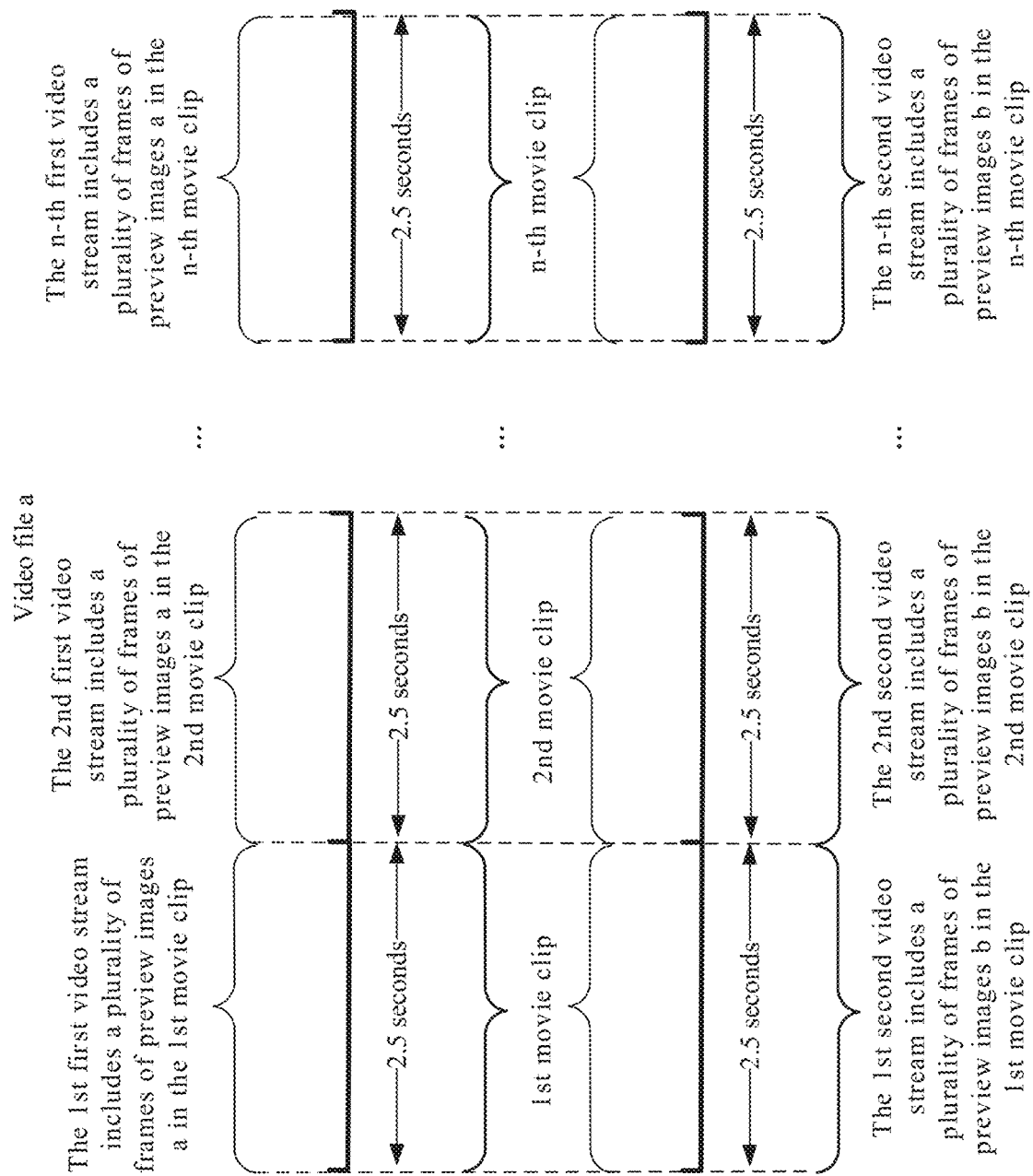
FIG. 20 is a schematic diagram of composition of another video file according to an embodiment of this application.

For example, as shown in FIG. 20, the video file a includes n first video streams, namely, the 1st first video stream, the 2nd first video stream, . . . , and the n-th first video stream. All preview images a in the 1st movie clip (such as the first 2.5 s) are spliced in time sequence to obtain the 1st first video stream; all preview images a in the 2nd movie clip (such as the second 2.5 s) are spliced in time sequence to obtain the 2nd first video stream; . . . ; and all preview images a in the n-th movie clip (such as the n-th 2.5 s) are spliced in time sequence to obtain the n-th first video stream.

In addition, the video file a further includes n second video streams, namely, the 1st first video stream, the 2nd first video stream, . . . , and the n-th first video stream. All preview images b in the 1st movie clip (such as the first 2.5 s) are spliced in time sequence to obtain the 1st second video stream; all preview images b in the 2nd movie clip (such as the second 2.5 s) are spliced in time sequence to obtain the 2nd second video stream; . . . ; and all preview images b in the n-th movie clip (such as the n-th 2.5 s) are spliced in time sequence to obtain the n-th second video stream.

Finally, the mobile phone generates n first video streams and n second video streams. In this way, a video file with a dynamic effect is obtained.

To sum up, according to the method in this embodiment of this application, during dual-cam video recording, the mobile phone can perform, according to the animation template, animation processing in real time on the real-time images collected by the two cameras, and display processed preview images on the recording viewfinder screen. This can reduce difficulties in recording videos with dynamic effects. An animation processing result can be presented to the user in real time, which helps preview a recording result in real time.

After recording ends, the mobile phone generates a video file a with a dynamic effect. In this way, a video with a dynamic effect can be obtained intelligently Further, before the video file a is generated, n first video streams and n second video streams need to be obtained. Then, a video file a including n first video streams and n second video streams is generated.

In some embodiments, in response to the event c, the mobile phone obtains n first video streams and n second video streams. In this way, after the mobile phone is triggered to save the video with the dynamic effect, all video streams can be obtained through centralized processing, thereby avoiding repeatedly invoking a same program.

In some other embodiments, in response to an event that recording of the k-th movie clip is completed (for example, the recording countdown timer expires), the mobile phone performs processing to obtain the k-th first video stream and the k-th second video corresponding to the k-th movie clip. In this way, after recording of a corresponding movie clip is completed, the first video stream and the second video stream corresponding to the movie clip can be obtained in a timely manner.

Figure 21:
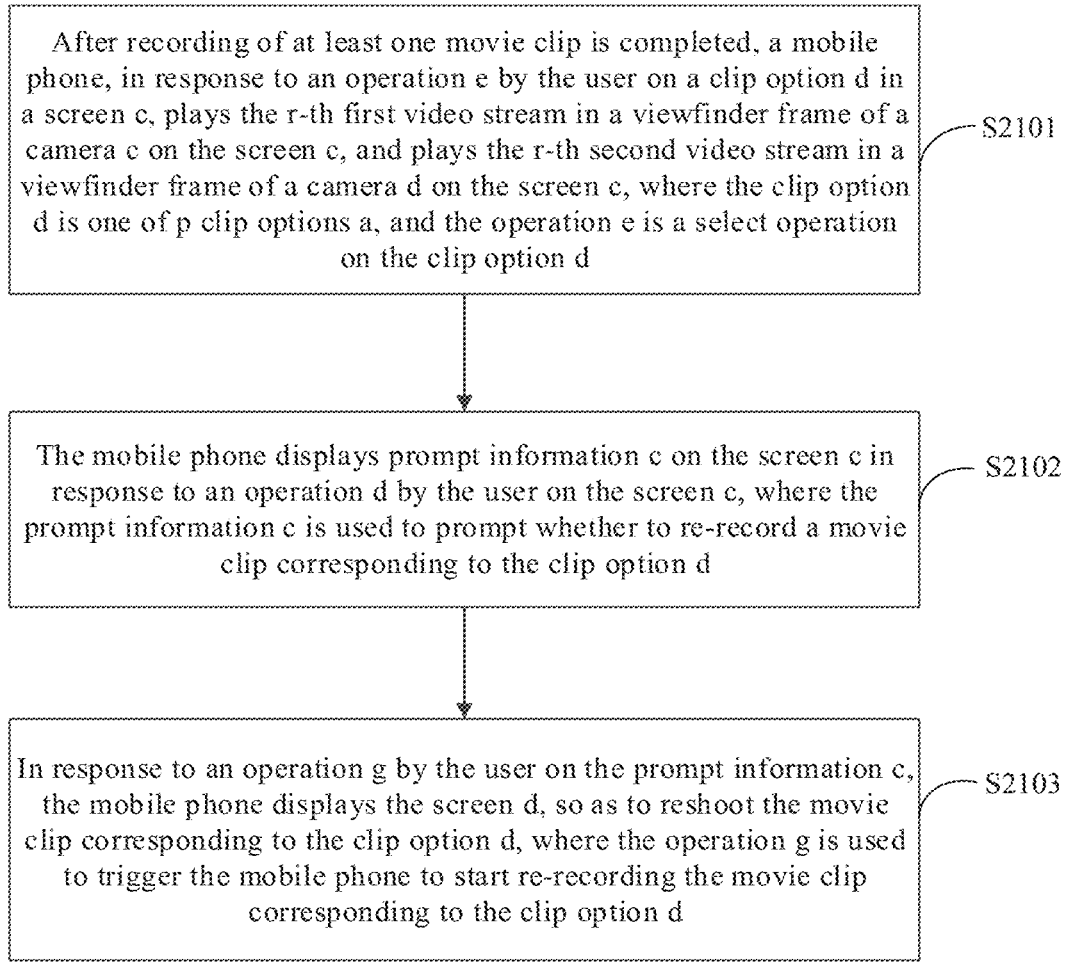
FIG. 21 is a flowchart of a video re-recording method according to an embodiment of this application.

In a specific implementation, obtaining the k-th first video stream and the k-th second video stream in a timely manner further helps the user to view, in a timely manner, a recording effect of each film segment that has been recorded completely; and re-recording starts in a case of a poor recording effect. Re-recording means re-shooting. Specifically, as shown in FIG. 21, the re-recording process includes S2101 to S2103.

S2101. After recording of at least one movie clip is completed, the mobile phone, in response to an operation e by the user on a clip option d in the screen c, plays the r-th first video stream in a viewfinder frame of the camera c on the screen c, and plays the r-th second video stream in a viewfinder frame of the camera d on the screen c, where the clip option d is one of p clip options a, and the operation e is a select operation on the clip option d.

The clip option d may also be referred to as a second clip option. The second clip option corresponds to a second movie clip, and the second movie clip includes the r-th first video stream and the r-th second video stream. The clip option a is a clip option corresponding to a movie clip recorded completely.

Before S2101, the mobile phone may receive an operation e by the user on the clip option d in the screen c. The operation e may be a tap operation, a touch-and-hold operation, or the like.

Figure 22:
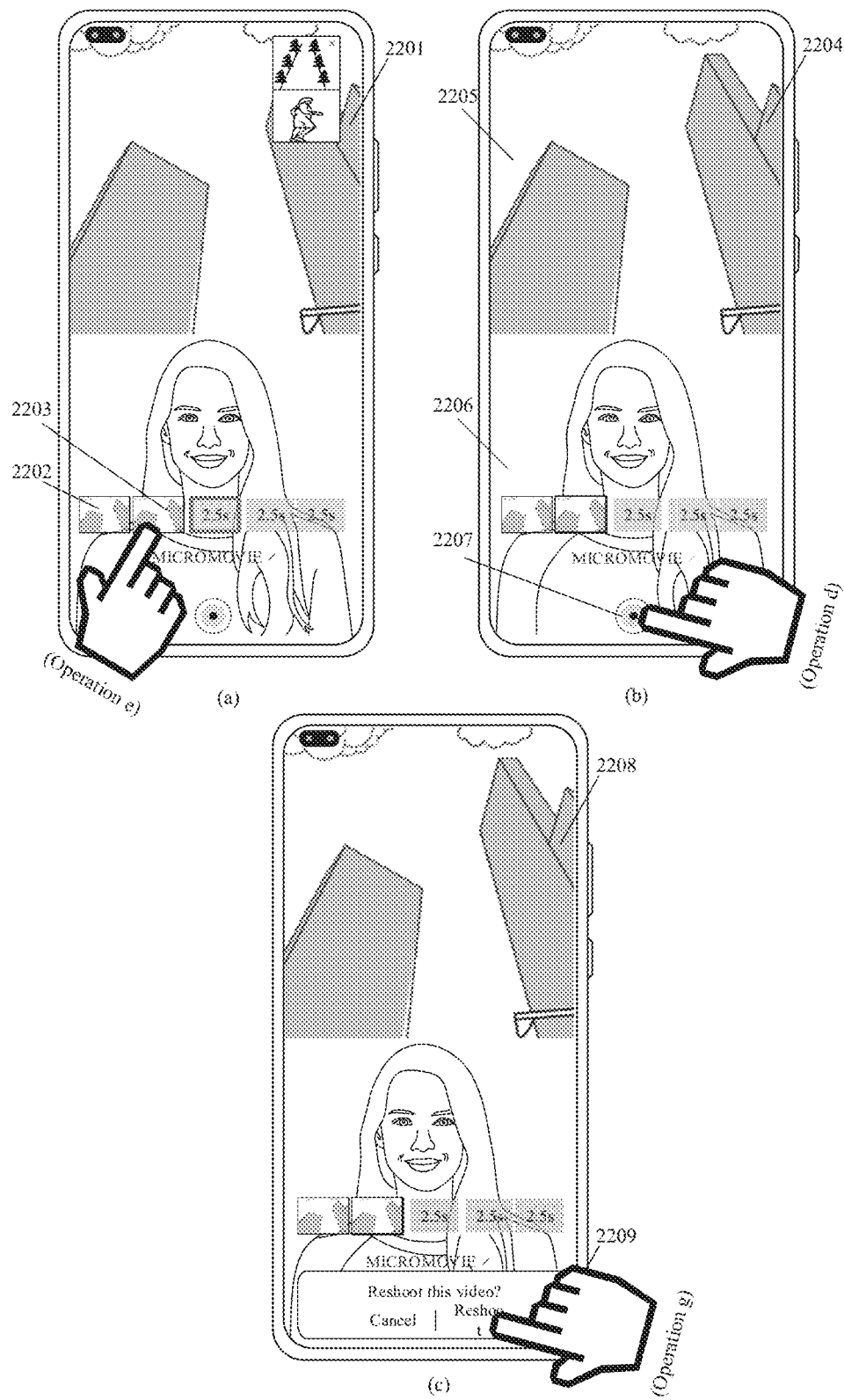
FIG. 22 is a schematic diagram of another video recording screen of a mobile phone according to an embodiment of this application.

For example, after recording of the 1st movie clip and the 2nd movie clip is completed, the mobile phone may display a screen c 2201 shown in (a) of FIG. 22. The screen c 2201 includes a total of 5 clip options, where a clip option 2202 and a clip option 2203 have covers, indicating that recording of the 1st movie clip and the 2nd movie clip has been completed respectively. The mobile phone may receive a tap operation by the user on the 2nd clip option 2203. In response to the tap operation by the user on the 2nd clip option 2203, the mobile phone may display a screen c 2204 shown in (b) of FIG. 22. The screen c 2204 includes a viewfinder frame 2205 of the camera c and a viewfinder frame 2206 of the camera d. The 2nd first video stream corresponding to the 2nd movie clip is played in the viewfinder frame 2205, and the 2nd second video stream corresponding to the 2nd movie clip is played in the viewfinder frame 2206.

S2102: The mobile phone displays prompt information c on the screen c in response to an operation d by the user on the screen c, where the prompt information c is used to prompt whether to re-record a movie clip corresponding to the clip option d.

The prompt information c may also be referred to as first prompt information.

Before S2102, the mobile phone may receive the operation d on the screen c by the user. For description of the operation d, reference may be made to related description of S1402, and details are not repeated herein.

For example, the screen c including a control f and the operation d being a tap operation on the control f is used as an example. The mobile phone may receive a tap operation by the user on a control f 2207 shown in (b) of FIG. 22. In response to the tap operation by the user on the control f 2207, the mobile phone may display a screen c 2208 shown in (c) of FIG. 22. The screen c 2208 includes prompt information c 2209, and specific content of the prompt information c 2209 is: Whether to re-record the video.

In this embodiment, the mobile phone does not directly perform recording in response to the operation d, but first prompts the user whether re-recording is required, thereby implementing more accurate re-recording.

S2103: In response to an operation g by the user on the prompt information c, the mobile phone displays the screen d, so as to reshoot the movie clip corresponding to the clip option d, where the operation g is used to trigger the mobile phone to start re-recording the movie clip corresponding to the clip option d.

The operation g may also be referred to as a fifth operation.

Before S2103, the mobile phone may receive the operation g on the prompt information c by the user. The operation g may be a preset gesture d for the prompt information c. For example, the preset gesture d is a circle gesture on "Reshoot" in the prompt information c 2209 shown in (c) of FIG. 22; or the prompt information c includes a control 1 and a control 2, where the control 1 is used to trigger the mobile phone to cancel re-recording, and the control 2 is used to trigger the mobile phone to start re-recording. The operation g may be a tap operation on the control 2. For example, a "Cancel" button in the prompt information c 2209 shown in (c) of FIG. 22 is the control 1, and the "Reshoot" button is the control 2.

The mobile phone displays the screen d in response to the operation g on the prompt information c by the user. For the screen d, reference may be made to related description of S1402, and details are not repeated herein.

The foregoing embodiments describe a case in which recording of at least one movie clip is successfully completed. In practice, the user may exit recording before completing recording of a plurality of movie clips.

In this case, the mobile phone displays prompt information d on the screen c in response to an operation h by the user on the screen c. The operation h is used to trigger the mobile phone to exit micro-movie recording. The prompt information d is used to prompt the user whether to save the video streams (such as the first video stream and the second video stream) of the movie clips recorded completely. In response to an operation i by the user on the prompt information d, the mobile phone saves the video streams of the movie clip recorded completely, wherein the operation i triggers the mobile phone to save the video streams. Then, when the user accesses the screen a again, the mobile phone displays a screen c in response to an operation a by the user on the screen a. The screen c includes a plurality of clip options, and in the plurality of clip options, a clip option a pointing to the last movie clip recorded completely is displayed differently from a clip option b pointing to the last movie clip not yet recorded completely. In this way, when recording starts next time, recording can be further performed on the basis of a video stream of the movie clip stored last time.

Figure 23:
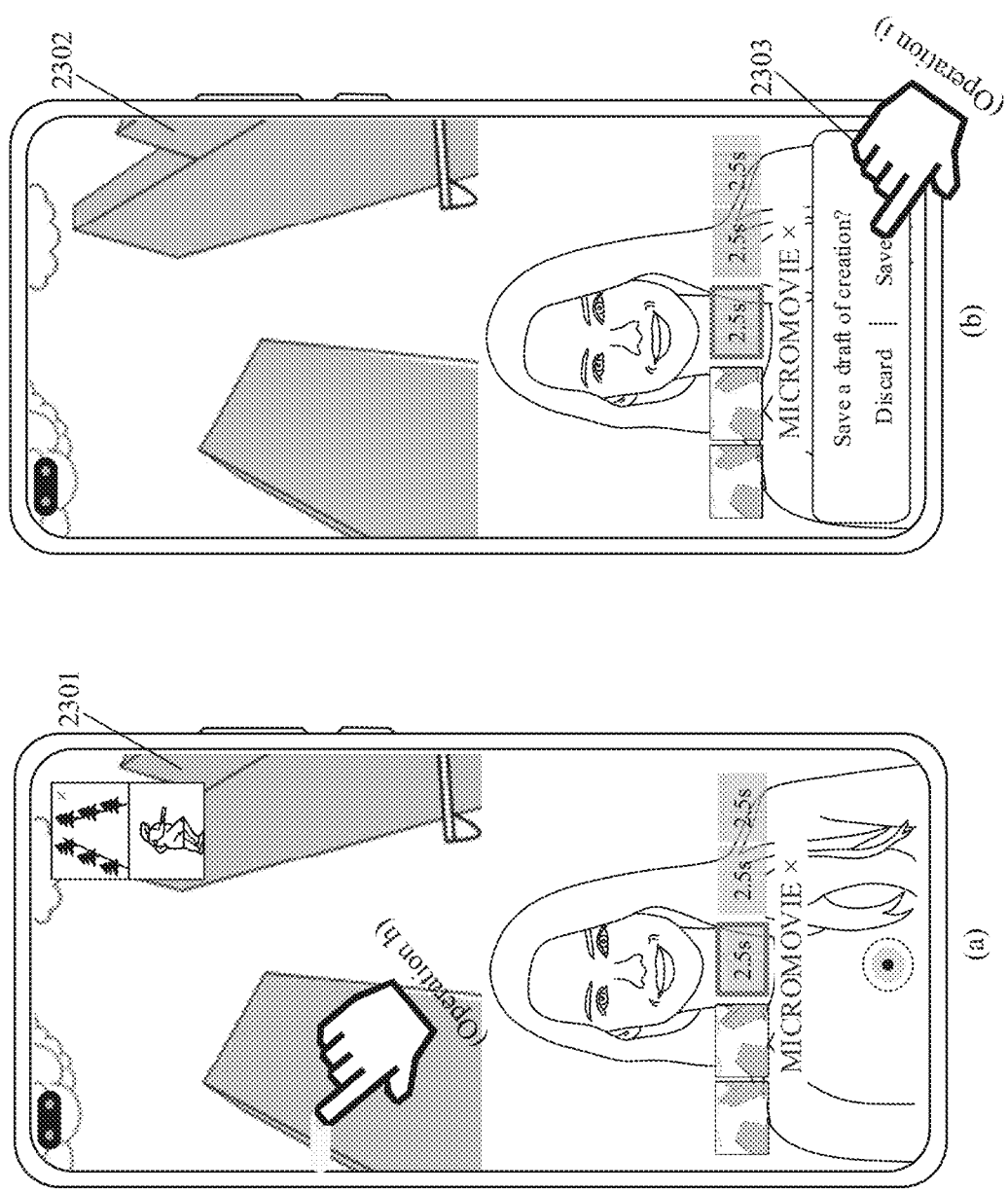
FIG. 23 is a schematic diagram of another video recording screen of a mobile phone according to an embodiment of this application.

For example, the operation h is a left-to-right slide gesture on the screen c by the user, and the operation i is a tap operation by the user on a third control (a "Save" button in the prompt information d 2304 shown in (b) of FIG. 23) in the prompt information d. After completing recording of two movie clips, the mobile phone displays a screen c 2301 shown in (a) of FIG. 23. In response to a left-to-right slide gesture on the screen c 2301 by the user, the mobile phone may display a screen c 2302 shown in (b) of FIG. 23. The screen c 2302 includes prompt information d 2303. In response to a tap operation by the user on the "Save" button in the prompt information d 2303, the mobile phone saves the 1st video stream corresponding to the 1st movie clip and the 2nd video stream corresponding to the 2nd movie clip. Then, when the user accesses the screen a 601 shown in (a) of FIG. 6 again, in response to a tap operation by the user on the control c 602 in the screen a 601, the mobile phone may display the screen c 2301 shown in (a) of FIG. 23.

Finally, it should be noted that if the screen c includes clip options, it may clearly indicate information such as the number and duration of movie clips, and may also clearly indicate movie clips recorded completely and movie clips not yet recorded completely, or may help the user to selects a movie clip. In some other embodiments, in order to simplify screen elements, the screen c may alternatively include no clip options. For example, in the embodiment in which a movie clip to be recorded is automatically selected by the mobile phone, the user has no requirement for selecting a movie clip to be recorded, so that the clip options may not be included in the screen c.

Some other embodiments of this application provide an electronic device, and the electronic device may include: the display (for example, a touch screen), a memory, and one or more processors. The display and the memory are coupled to the processor. The memory is configured to store computer program code, and the computer program code includes a computer instruction. When the processor executes the computer instruction, the electronic device can execute various functions or steps that are executed by the mobile phone in the foregoing method embodiments. For a structure of the electronic device, reference may be made to a structure of the mobile phone 400 shown in FIG. 5.

Figure 24:
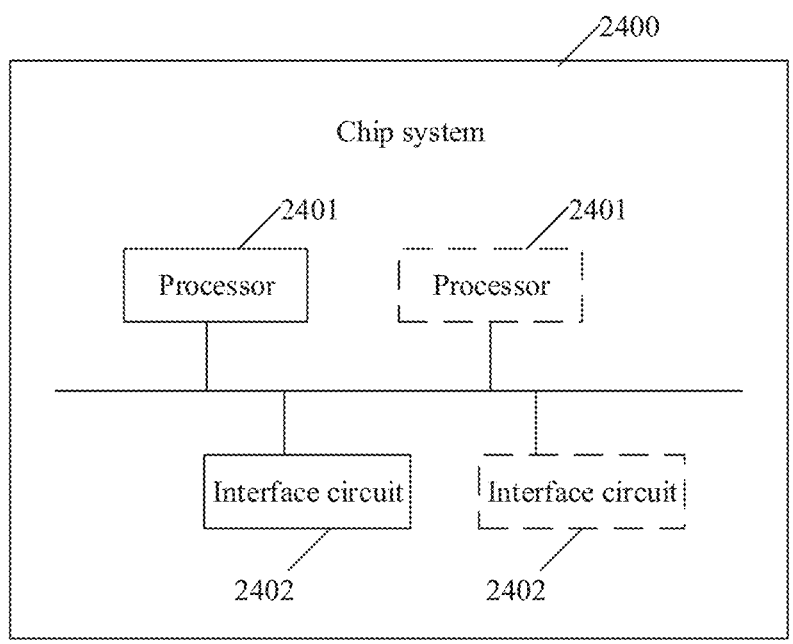
FIG. 24 is a schematic structural diagram of a chip system according to an embodiment of this application.

An embodiment of this application further provides a chip system. As shown in FIG. 24, the chip system 2400 includes at least one processor 2401 and at least one interface circuit 2402. The processor 2401 and the interface circuit 2402 may be interconnected by lines. For example, the interface circuit 2402 may be configured to receive signals from other apparatuses (for example, the memory of the electronic device). For another example, the interface circuit 2402 may be configured to send signals to other apparatuses (for example, the processor 2401). For example, the interface circuit 2402 can read an instruction stored in the memory and send the instruction to the processor 2401. When the instructions are executed by the processor 2401, the electronic device can be enabled to perform the steps in the foregoing embodiments. Certainly, the chip system may further include other discrete devices, and this is not specifically limited in this embodiment of this application.

An embodiment of this application further provides a computer storage medium, where the computer storage medium includes computer instructions. When the computer instructions are run on the foregoing electronic device, the electronic device is enabled to execute the functions or steps that are executed by the mobile phone in the foregoing method embodiments.

An embodiment of this application further provides a computer program product, where when the computer program product runs on a computer, the computer is enabled to execute the functions or steps that are executed by the mobile phone in the foregoing method embodiments.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the method described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing content is merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    displaying a first screen, wherein the first screen is a viewfinder screen before an electronic device starts recording, wherein the first screen comprises real-time images collected by two cameras of a plurality of cameras of the electronic device, and wherein the first screen comprises a first control;
    displaying a plurality of mode options in response to a tap operation on the first control by a user;
    displaying a plurality of template options in response to a first operation by a user, wherein each template option corresponds to an animation template for image processing, and wherein the animation templates are for processing preview images collected by at least two cameras in the plurality of cameras;
    displaying a second screen in response to a second operation by the user on a first template option in the plurality of template options;

playing an animation effect of a first animation template corresponding to the first template option on the second screen;

displaying a third screen in response to a third operation by the user on the second screen, wherein the third screen comprises a first real-time image collected by a first camera and a second real-time image collected by a second camera;

displaying a fourth screen and starting to record a video in response to a fourth operation by the user on the third screen; and skipping responding to a fifth operation by the user on the fourth screen during the recording of the video, wherein the fifth operation is configured to trigger the electronic device to exchange a viewfinder frame of the first camera with a viewfinder frame of the second camera on the fourth screen, wherein the fourth screen does not comprise the first control.

2. The method of claim 1, wherein the video recorded with the first animation template comprises a plurality of movie clips, wherein the first animation template comprises a plurality of animation sub-templates, wherein the plurality of movie clips are in one-to-one correspondence to the plurality of animation sub-templates, wherein the fourth operation is configured to trigger the electronic device to record a first movie clip, wherein the first movie clip is any one of the plurality of movie clips, wherein the first movie clip corresponds to a first animation sub-template, wherein the fourth screen comprises a first preview image and a second preview image, wherein the first preview image is obtained by the electronic device through animation processing on the first real-time image with the first animation sub-template, and wherein the second preview image is obtained by the electronic device through animation processing on the second real-time image with the first animation sub-template.

3. The method of claim 2, wherein after the electronic device displays the fourth screen, the method further comprises displaying the third screen in response to a first event, wherein the first event is an event that recording of the first movie clip has been completed.

4. The method of claim 2, wherein the third screen further comprises a first window, and wherein the first window is configured to play an animation effect corresponding to the first animation sub-template.

5. The method of claim 2, wherein each animation sub-template comprises a first sub-template and a second sub-template, wherein the first sub-template is for animation processing on the first real-time image by the electronic device, and wherein the second sub-template is for animation processing on the second real-time image by the electronic device.

6. The method of claim 2, comprising saving a first video file in response to a second event, wherein the second event is configured to trigger the electronic device to save a processed video, wherein the first video file comprises a plurality of first video streams and a plurality of second video streams, wherein the plurality of first video streams are in one-to-one correspondence to a plurality of movie clips, wherein the plurality of second video streams are in one-to-one correspondence to a plurality of movie clips, wherein each first video stream comprises a plurality of frames of first preview images obtained by processing the corresponding movie clips, and wherein each second video stream comprises a plurality of frames of second preview images obtained by processing the corresponding movie clips.

7. The method of claim 2, wherein the third screen comprises p first clip options, wherein p≥0, p is a natural number, and p is a number of clips in movie clips recorded completely, wherein each first clip option corresponds to one movie clip recorded completely, and wherein the third screen further comprises a second control, the method further comprising:

receiving a select operation by the user on a second clip option, wherein the second clip option is one of the p first clip options, and the second clip option corresponds to a second movie clip;

playing, on the third screen in response to the select operation by the user on the second clip option, a plurality of processed frames of first preview images in the second movie clip and a plurality of processed frames of second preview images in the second movie clip;

displaying first prompt information in the second screen in response to a tap operation by the user on the second control, wherein the first prompt information is to prompt whether to reshoot the second movie clip; and displaying the fourth screen in response to a sixth operation by the user on the first prompt information, so as to reshoot the second movie clip.

8. The method of claim 2, wherein the third screen comprises q third clip options, wherein q≥0, q is a natural number, and q is a number of clips in the movie clips not yet completely recorded, wherein each third clip option corresponds to one movie clip not yet completely recorded, wherein the third screen further comprises a second control, and wherein before receiving the fourth operation on the third screen, the method further comprises selecting a fourth clip option in response to a third event, wherein the fourth clip option is one of the q third clip options, wherein the fourth clip option corresponds to the first movie clip, and wherein the fourth operation is a tap operation performed by the user on the second control in a case that the fourth clip option is selected.

9. The method of claim 1, wherein the fifth operation comprises a touch-and-hold operation or a drag operation.

10. The method of claim 1, wherein different animation templates are applicable to different cameras, the method further comprising starting the first camera and the second camera in response to the third operation by the user on the second screen, wherein the first camera and the second camera are cameras to which the first animation template is applicable.

11. The method of claim 1, wherein the first screen comprises a third control, wherein the third control is configured to trigger the electronic device to display a plurality of template options, and wherein the first operation is a tap operation or a touch-and-hold operation on the third control.

12. The method of claim 1, wherein the first screen comprises a fourth control, and wherein displaying the second screen in response to the second operation comprises:

selecting the first template option in response to a select operation by the user on the first template option in the plurality of template options; and in a case that the electronic device has selected the first template option, displaying the second screen in response to a tap operation by the user on the fourth control.

13. An electronic device, comprising:
a processor;
a plurality of cameras coupled to the processor;

a display coupled to the processor; and a memory coupled to the processor, wherein the memory is configured to store computer instructions that, when executed by the processor, cause the electronic device to be configured to:

display a first screen on the display, wherein the first screen is a viewfinder screen before the electronic device starts recording, wherein the first screen comprises real-time images collected by two cameras in the plurality of cameras, and wherein the first screen comprises a first control;

display a plurality of mode options on the display in response to a tap operation on the first control by a user;

display a plurality of template options on the first screen in response to a first operation by a user on the first screen, wherein each template option corresponds to an animation template for image processing, and wherein the animation templates are for processing preview images collected by at least two cameras in the plurality of cameras;

display a second screen on the display in response to a second operation by the user on a first template option in the plurality of template options;

play an animation effect of a first animation template corresponding to the first template option on the second screen;

display a third screen on the display in response to a third operation by the user on the second screen, wherein the third screen comprises a first real-time image collected by a first camera and a second real-time image collected by a second camera;

display a fourth screen on the display and start to record a video in response to a fourth operation by the user on the third screen; and skip responding to a fifth operation by the user on the fourth screen during the recording of the video, wherein the fifth operation is configured to trigger the electronic device to exchange a viewfinder frame of the first camera with a viewfinder frame of the second camera on the fourth screen, wherein the fourth screen does not comprise the first control.

14. The electronic device of claim 13, wherein the video recorded with the first animation template comprises a plurality of movie clips, wherein the first animation template comprises a plurality of animation sub-templates, wherein the plurality of movie clips are in one-to-one correspondence to the plurality of animation sub-templates, wherein the fourth operation is configured to trigger the electronic device to record a first movie clip, wherein the first movie clip is any one of the plurality of movie clips, wherein the first movie clip corresponds to a first animation sub-template, wherein the fourth screen comprises a first preview image and a second preview image, wherein the first preview image is obtained by the electronic device through animation processing on the first real-time image with the first animation sub-template, and wherein the second preview image is obtained by the electronic device through animation processing on the second real-time image with the first animation sub-template.

15. The electronic device of claim 14, wherein after the electronic device displays the fourth screen, the computer instructions, when executed by the processor, further cause the electronic device to be configured to display the third screen in response to a first event, wherein the first event is an event that recording of the first movie clip has been completed.

16. The electronic device of claim 14, wherein the third screen further comprises a first window, and wherein the first window is configured to play an animation effect corresponding to the first animation sub-template.

17. A non-transitory computer-readable storage medium containing instructions that when executed by a processor of an electronic device, cause the electronic device to be configured to:

display a first screen on a display of the electronic device, wherein the first screen is a viewfinder screen before the electronic device starts recording, wherein the first screen comprises real-time images collected by two cameras in a plurality of cameras of the electronic device, and wherein the first screen comprises a first control;

display a plurality of mode options on the display in response to a tap operation on the first control by a user;

display a plurality of template options on the first screen in response to a first operation by a user on the first screen, wherein each template option corresponds to an animation template for image processing, and wherein the animation templates are for processing preview images collected by at least two cameras in the plurality of cameras;

display a second screen on the display in response to a second operation by the user on a first template option in the plurality of template options;

play an animation effect of a first animation template corresponding to the first template option on the second screen;

display a third screen on the display in response to a third operation by the user on the second screen, wherein the third screen comprises a first real-time image collected by a first camera and a second real-time image collected by a second camera;

display a fourth screen on the display and start to record a video in response to a fourth operation by the user on the third screen; and skip responding to a fifth operation by the user on the fourth screen during the recording of the video, wherein the fifth operation is configured to trigger the electronic device to exchange a viewfinder frame of the first camera with a viewfinder frame of the second camera on the fourth screen, wherein the fourth screen does not comprise the first control.

18. The non-transitory computer-readable storage medium of claim 17, wherein the video recorded with the first animation template comprises a plurality of movie clips, wherein the first animation template comprises a plurality of animation sub-templates, wherein the plurality of movie clips are in one-to-one correspondence to the plurality of animation sub-templates, wherein the fourth operation is configured to trigger the electronic device to record a first movie clip, wherein the first movie clip is any one of the plurality of movie clips, wherein the first movie clip corresponds to a first animation sub-template, wherein the fourth screen comprises a first preview image and a second preview image, wherein the first preview image is obtained by the electronic device through animation processing on the first real-time image with the first animation sub-template, and wherein the second preview image is obtained by the electronic device through animation processing on the second real-time image with the first animation sub-template.

19. The non-transitory computer-readable storage medium of claim 18, wherein after the electronic device displays the fourth screen, the instructions, when executed by the processor, further cause the electronic device to be configured to display the third screen in response to a first event, wherein the first event is an event that recording of the first movie clip has been completed.

20. The non-transitory computer-readable storage medium of claim 18, wherein the third screen further comprises a first window, and wherein the first window is configured to play an animation effect corresponding to the first animation sub-template.

* * * * *